US012211228B2

(12) United States Patent
Aruga et al.

(10) Patent No.: US 12,211,228 B2
(45) Date of Patent: Jan. 28, 2025

(54) INFORMATION PROCESSING DEVICE, CONTROL METHOD, AND STORAGE MEDIUM

(71) Applicant: NEC Corporation, Tokyo (JP)

(72) Inventors: Akane Aruga, Tokyo (JP); Yasunori Babazaki, Tokyo (JP); Katsumi Kikuchi, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/788,084

(22) PCT Filed: Dec. 26, 2019

(86) PCT No.: PCT/JP2019/051218
§ 371 (c)(1),
(2) Date: Jun. 22, 2022

(87) PCT Pub. No.: WO2021/130982
PCT Pub. Date: Jul. 1, 2021

(65) Prior Publication Data
US 2023/0021345 A1 Jan. 26, 2023

(51) Int. Cl.
G06T 7/70 (2017.01)
G02B 27/01 (2006.01)

(52) U.S. Cl.
CPC .............. *G06T 7/70* (2017.01); *G02B 27/017* (2013.01); *G02B 2027/014* (2013.01); *G02B 2027/0141* (2013.01)

(58) Field of Classification Search
CPC .......... G02B 27/017; G02B 2027/0138; G02B 2027/014; G02B 2027/0141; G06T 7/70;
(Continued)

(56) References Cited

U.S. PATENT DOCUMENTS 10,003,786 B2 * 6/2018 Kouperman ......... H04N 13/243
10,271,040 B1 * 4/2019 Marchak, Jr. .......... G06V 20/42
(Continued)

FOREIGN PATENT DOCUMENTS

JP 2011-159162 A 8/2011
JP 2015-022737 A 2/2015
(Continued)

OTHER PUBLICATIONS

International Search Report for PCT Application No. PCT/JP2019/051218, mailed on Mar. 24, 2020.

*Primary Examiner* — Katrina R Fujita
(74) *Attorney, Agent, or Firm* — Sughrue Mion, PLLC

(57) ABSTRACT

The information processing device 4 includes an acquisition unit 40A, a structural feature point extraction unit 41A, a common coordinate system transformation unit 42A, and a structural feature point integration unit 43A. The acquisition unit 40A is configured to acquire captured images Im generated by plural image acquisition devices 5 and positional relation information Ip indicative of a positional relation among the plural image acquisition device 5. The structural feature point extraction unit 41A is configured to extract, from each of the captured images Im, intra-image coordinate values Pi for structural feature points, which are structural feature points of a target structure of observation through a display device, the display device displaying a virtual object superimposed on a view. The common coordinate system transformation unit 42A is configured to convert, based on the positional relation information Ip, the intra-image coordinate values Pi for each of the structural feature points extracted from each of the captured images Im into individual coordinate values Pc indicating coordinate values in a common coordinate system which is a common three-dimensional coordinate system. The structural feature point integration unit 43A is configured to determine, for
(Continued)

each of the structural feature points, a representative coordinate value Pcr in the common coordinate system based on the individual coordinate values Pc in the common coordinate system.

14 Claims, 15 Drawing Sheets

(58) Field of Classification Search
CPC . G06T 7/74; G06T 19/00; G06T 2207/20076; G06T 2207/20081; G06T 2207/30221
See application file for complete search history.

(56) References Cited

U.S. PATENT DOCUMENTS

| | | | | |
|---|---|---|---|---|
| 10,552,984 | B2* | 2/2020 | Virodov | G06T 7/74 |
| 10,699,421 | B1* | 6/2020 | Cherevatsky | G06F 18/2113 |
| 10,867,432 | B2* | 12/2020 | Lodato | G06T 15/20 |
| 10,908,865 | B2* | 2/2021 | Vembar | G09G 5/363 |
| 11,049,267 | B2* | 6/2021 | Selviah | G06T 7/33 |
| 11,215,465 | B2* | 1/2022 | Hare | G01C 21/3848 |
| 11,218,687 | B2* | 1/2022 | Varekamp | H04N 13/156 |
| 11,676,388 | B2* | 6/2023 | Oami | G06T 7/292 |
| | | | | 348/159 |
| 2010/0259539 | A1* | 10/2010 | Papanikolopoulos | G06T 7/70 |
| | | | | 348/E13.074 |
| 2013/0194304 | A1* | 8/2013 | Latta | G09G 3/003 |
| | | | | 345/633 |
| 2013/0265330 | A1* | 10/2013 | Goto | G02B 27/0172 |
| | | | | 345/632 |
| 2015/0029219 | A1 | 1/2015 | Watanabe | |
| 2020/0090407 | A1* | 3/2020 | Miranda | G06T 19/006 |
| 2021/0241517 | A1* | 8/2021 | Segal | G06T 7/70 |
| 2021/0256034 | A1* | 8/2021 | Segal | G06T 11/00 |
| 2021/0375044 | A1* | 12/2021 | George | H04N 13/15 |
| 2022/0138984 | A1* | 5/2022 | Babazaki | G06V 10/806 |
| | | | | 382/159 |
| 2023/0011625 | A1* | 1/2023 | Babazaki | G06T 19/00 |

FOREIGN PATENT DOCUMENTS

| | | |
|---|---|---|
| JP | 2016-177834 A | 10/2016 |
| JP | 2016-219968 A | 12/2016 |
| JP | 2018-022242 A | 2/2018 |

* cited by examiner

INFORMATION PROCESSING DEVICE, CONTROL METHOD, AND STORAGE MEDIUM

This application is a National Stage Entry of PCT/JP2019/051218 filed on Dec. 26, 2019, the contents of all of which are incorporated herein by reference, in their entirety.

TECHNICAL FIELD

The present invention relates to a technical field of an information processing device, a control method, and a storage medium for performing processing related to space understanding in augmented reality (AR: Augmented Reality).

BACKGROUND ART

For such a device providing an augmented reality, there is a technique of determining the display position of an image (so-called AR image) to be displayed over the view that the user visually recognizes based on images captured by a camera. For example, Patent Literature 1 discloses an image processing device configured to store feature data representing features of the appearances of objects and to generate an environment map representing the position of an object present in the real space based on an image obtained from an imaging device and the above feature data thereby to display, based on the environment map, a description relating to a series of procedures of the work to be performed in the real space.

CITATION LIST

Patent Literature

Patent Literature 1: JP 2011-159162A

SUMMARY

Problem to be Solved

When an AR display device (AR device) is used for sports viewing and theater viewing, it is necessary to carry out calibration on the coordinate correction for the AR device to grasp the real-world space accurately. This calibration results in such an issue that the accuracy of the calibration differs depending on where each user uses the AR device when the sports field or theatrical field is used as a reference of the calibration.

In view of the above-described issue, it is therefore an example object of the present disclosure to provide an information processing device, a control method, and a storage medium capable of suitably performing the calibration of a display device which provides an augmented reality.

Means for Solving the Problem

In one mode of the information processing device, there is provided an information processing device including: an acquisition unit configured to acquire captured images generated by plural image acquisition devices and positional relation information indicative of a positional relation among the plural image acquisition device; a structural feature point extraction unit configured to extract, from each of the captured images, intra-image coordinate values for structural feature points, which are structural feature points of a target structure of observation through a display device, the display device displaying a virtual object superimposed on a view; a common coordinate system transformation unit configured to convert, based on the positional relation information, intra-image coordinate values for each of the structural feature points extracted from each of the captured images into individual coordinate values indicating coordinate values in a common coordinate system which is a common three-dimensional coordinate system; and a structural feature point integration unit configured to determine, for each of the structural feature points, a representative coordinate value in the common coordinate system based on the individual coordinate values in the common coordinate system.

In one mode of the control method, there is provided a control method executed by an information processing device, the control method including: acquiring captured images generated by plural image acquisition devices and positional relation information indicative of a positional relation among the plural image acquisition device; extracting, from each of the captured images, intra-image coordinate values for structural feature points, which are structural feature points of a target structure of observation through a display device, the display device displaying a virtual object superimposed on a view; converting, based on the positional relation information, intra-image coordinate values for each of the structural feature points extracted from each of the captured images into individual coordinate values indicating coordinate values in a common coordinate system which is a common three-dimensional coordinate system; and determining, for each of the structural feature points, a representative coordinate value in the common coordinate system based on the individual coordinate values in the common coordinate system.

In one mode of the storage medium, there is provided a storage medium storing a program executed by a computer, the program causing the computer to function as: an acquisition unit configured to acquire captured images generated by plural image acquisition devices and positional relation information indicative of a positional relation among the plural image acquisition device; a structural feature point extraction unit configured to extract, from each of the captured images, intra-image coordinate values for structural feature points, which are structural feature points of a target structure of observation through a display device, the display device displaying a virtual object superimposed on a view; a common coordinate system transformation unit configured to convert, based on the positional relation information, intra-image coordinate values for each of the structural feature points extracted from each of the captured images into individual coordinate values indicating coordinate values in a common coordinate system which is a common three-dimensional coordinate system; and a structural feature point integration unit configured to determine, for each of the structural feature points, a representative coordinate value in the common coordinate system based on the individual coordinate values in the common coordinate system.

Effect

An example advantage according to the present invention is to determine the position of structural feature points of a target structure necessary for calibration of a display device which provides an augmented reality.

EXAMPLE EMBODIMENTS

Hereinafter, an example embodiment of an information processing device, a control method, and a storage medium will be described with reference to the drawings.

First Example Embodiment (1) Overall Configuration

Figure 1:
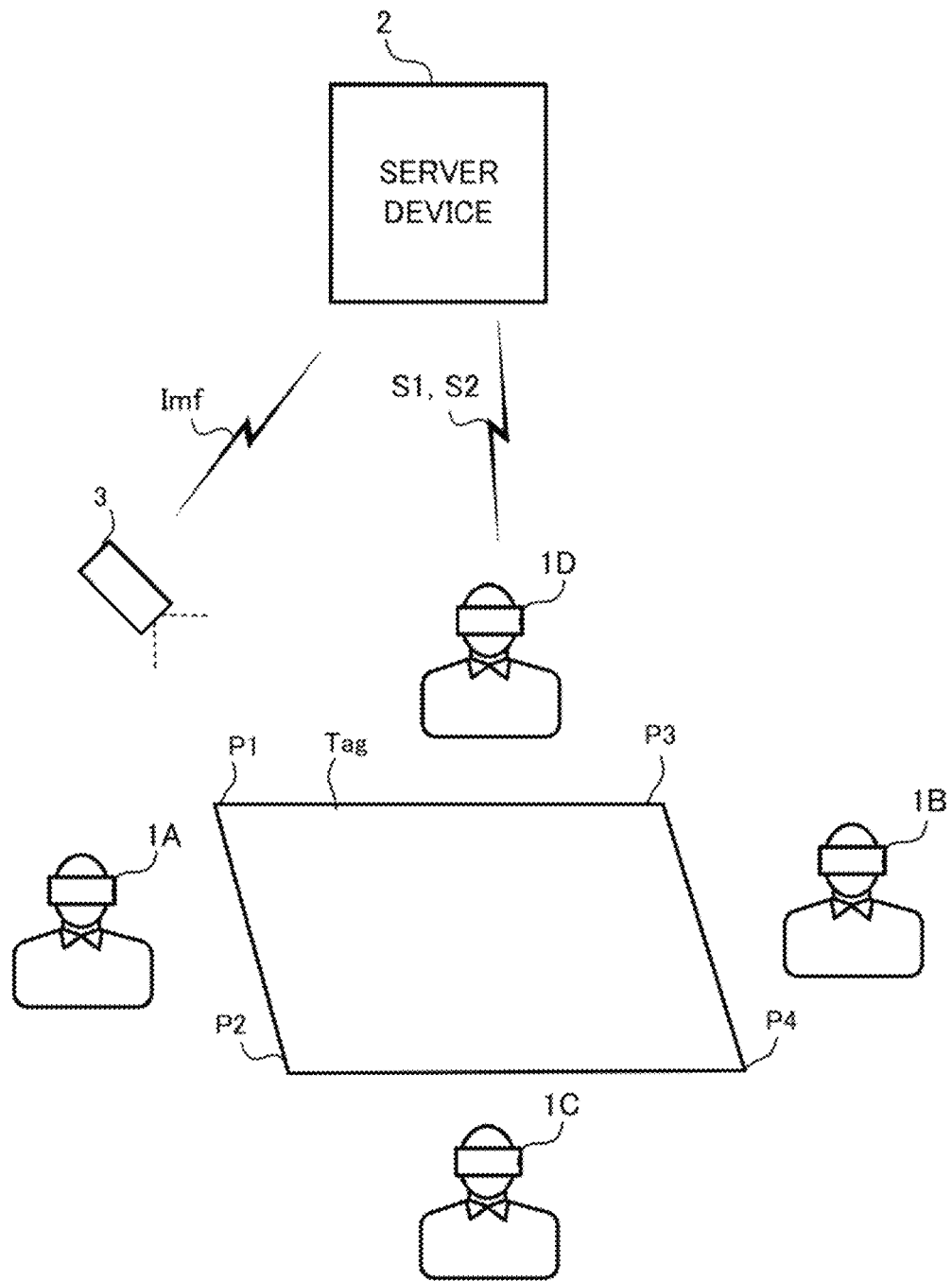
FIG. 1 is a schematic configuration diagram of a display device according to a first example embodiment.

FIG. 1 is a schematic configuration diagram of a display system 100 according to the first example embodiment. The display system 100 is a system that provides an augmented reality (AR) in a sports viewing or theater viewing in a structure (also referred to as "target structure Tag") where a sports or a theater (including a concert and a show) are performed. The display system 100 includes display devices 1 (1A to 1D) to be worn by the respective users to view the sports or theater, a server device 2 configured to distribute the information to be displayed by each display device 1 to each display device 1, and a fixed camera 3 whose shooting range includes the target structure Tag.

The target structure Tag is a stationary structure which is a place (stage) where a sports, a theatrical play, or the like are carried out. Examples of the target structure Tag include a playing field (e.g., a tennis court, a swimming pool, and a stadium) for sports viewing, or a theater (e.g., a concert hall, a multi-purpose hall, and a stage) for theatrical play. The target structure Tag includes a plurality of structural feature points that are characterized in shape. In FIG. 1, as an example, the target structure Tag has a rectangular shape and includes structural feature points P1 to P4 at its four corners. It is noted that the target structure Tag may have any shape other than a rectangular shape. Besides, the structural feature point is not limited to the corner of the target structure Tag and it may be any point labeled in advance as a structural feature point. Further, the feature points of the target structure Tag defined as the structural feature points are not limited to four, as will be described later, it may be at least three or more feature points not aligned on a straight line. Further, on such an assumption that there is a common axis (e.g., vertical axis) among each individual coordinate system referred to by each display device 1, the common coordinate system commonly used by each display device 1, and the structural coordinate system with reference to the target structure Tag, only two structural feature points is necessary to be defined. A detailed description of each coordinate system will be described later.

Each of the display devices 1 (1A to 1D) is a user-wearable device and, for example, a see-through eyeglass device and is configured to be wearable on the head of the user. In the sports viewing or theater viewing, the display device 1 superimposes and displays, on the user's field of view, one or more virtual objects (also referred to as "virtual objects") displayed as two-dimensional or three-dimensional objects at the position with reference to the target structure. The display device 1 transmits to the server device 2 the upload information "S1" which is information necessary for the server device 2 to perform processing related to the display of the virtual objects. The upload information S1 includes at least an image (also referred to as "device photographing image Imd") captured by the display device 1. When receiving display information "S2" from the server device 2, the display device 1 displays one or more virtual objects based on the display information S2.

Examples of the virtual object include a score board to be displayed above the tennis court in the case of tennis, and include a line indicative of the world record in real time to be superimposed on a pool during competitive swimming in the case of competitive swimming, and include a virtual performer to be superimposed on the stage in a theater (including concert). The display device 1 may display the virtual object only on one eye of the user, or may display the virtual object on both eyes. It is sufficient for the display system 100 to include at least two display devices 1 or include at least one display device 1 and one fixed camera 3, instead of the display system 100 shown in FIG. 1 in which the four display devices 1 are provided.

The fixed camera 3 is a camera with a shooting range including the target structure Tag and is fixed in the venue where the target structure Tag is present. The fixed camera 3 transmits a captured image (also referred to as "fixed camera image Imf") to the server device 2. It is noted that, although only one fixed camera 3 is shown in FIG. 1, multiple fixed cameras 3 may be provided in the venue of the target structure Tag. Further, the fixed camera 3 is not an essential configuration of the display system 100, and the server device 2 may generate the display information S2 without receiving the fixed camera image Imf.

Thereafter, if the device photographing image Imd and the fixed camera image Imf are not particularly distinguished, they are collectively referred to as "captured image Im". Similarly, if the fixed camera 3 for generating a fixed camera image Imf and the display device 1 for generating the device photographing image Imd are not particularly distinguished, these are collectively referred to as "image acquisition device".

The server device 2 is, for example, a server device managed by the promoter, and generates the display information S2 corresponding to each display device 1 based on the fixed camera image Imf received from the fixed camera 3 and the upload information S1 received from each display device 1. The server device 2 transmits the generated display information S2 to each display device 1, respectively.

(2) Configuration of Display Device

Figure 2:
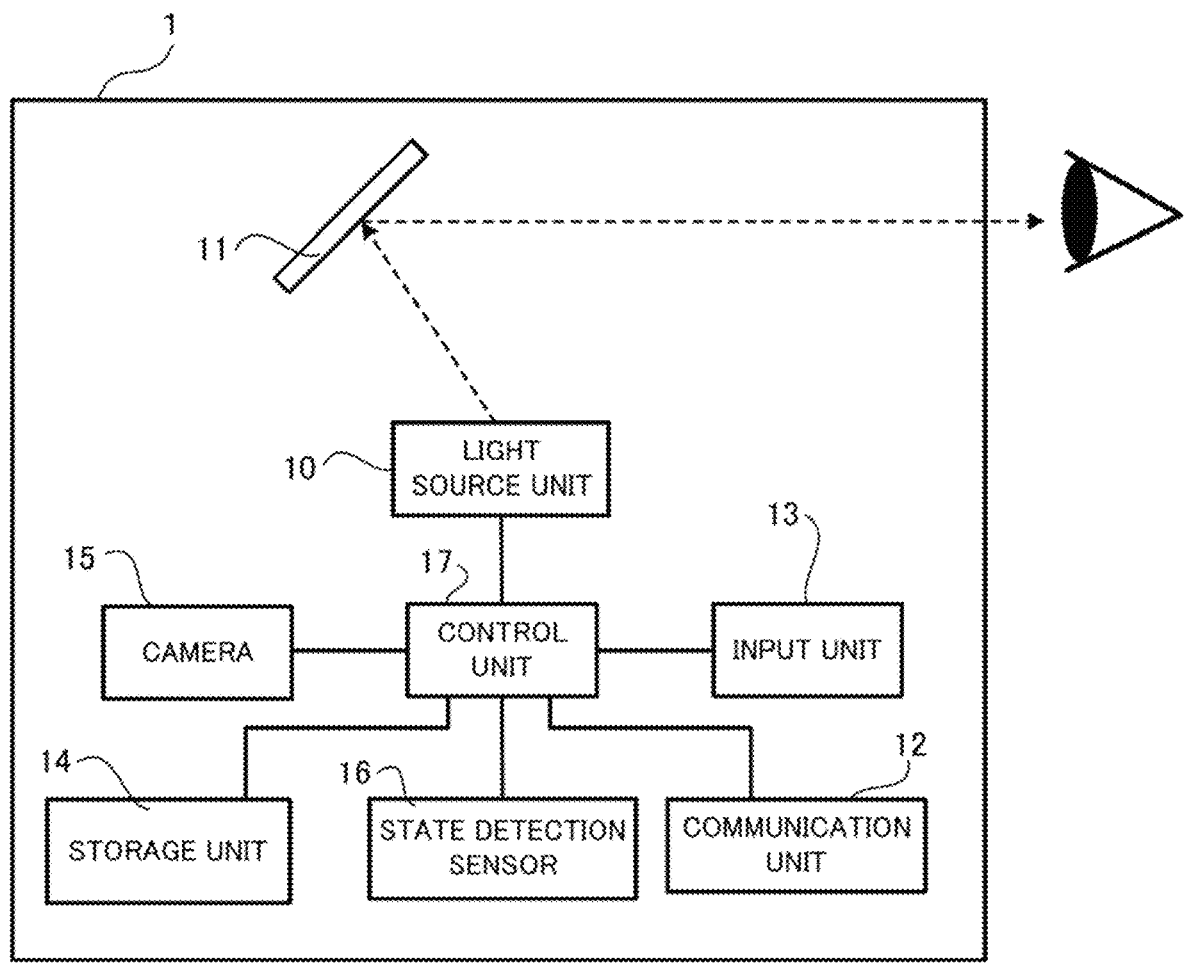
FIG. 2 is a schematic block diagram of the display device.

FIG. 2 is a schematic block diagram of a display device 1. The display device 1 includes a light source unit 10, an optical element 11, a communication unit 12, an input unit 13, a storage unit 14, a camera 15, a state detection sensor 16, and a control unit 17.

The light source unit 10 has a light source such as a laser light source and/or an LCD (Liquid Crystal Display) light source and emits light based on the driving signal supplied from the control unit 17. The optical element 11 has a predetermined transmittance and lets at least a portion of the external light pass through to enter the user's eye, and reflects at least a portion of the light from the light source unit 10 toward the user's eye. Thus, the virtual image corresponding to the virtual object formed by the display device 1 is visually recognized by the user in such a state where the virtual image overlaps with the view (scenery). The optical element 11 may be a half mirror whose transmittance and reflectance are substantially equal, or a mirror (so-called beam splitter) whose transmittance and reflectance are not equal.

The communication unit 12 transmits and receives data to and from an external device such as the server device 2 based on the control by the control unit 17. For example, the communication unit 12 transmits the upload information S1 to the server device 2 and receives the display information S2 transmitted from the server device 2.

The input unit 13 generates an input signal based on the user's operation and transmits the input signal to the control unit 17. Examples of the input unit 13 include a button, an arrow pad, and a voice input device which are used for the user to instruct the display device 1.

The storage unit 14 is a nonvolatile memory configured to store various information necessary for the control unit 17 to control the display device 1. The storage 14 may include a removable storage medium such as a flash memory. Further, the storage unit 14 stores a program to be executed by the control unit 17.

The camera 15 generates a device photographing image Imd in which the front direction of the display device 1 is photographed under the control by the control unit 17, and supplies the generated device photographing image Imd to the control unit 17.

The state detection sensor 16 is one or more sensors (sensor group) for detecting the state of the display device 1. The state detection sensor 16 is, for example, a sensor for detecting the posture of the display device 1, and the examples thereof include a gyroscope sensor, an acceleration sensor, an IMU (Inertial Measurement Unit), and a geomagnetic sensor. In addition, the status detection sensor 16 may include various positioning sensors, such as a GPS (Global Positioning Satellite) receiver.

The control unit 17 includes performs overall control of the display device 1 and includes, for example, one or more processors such as a CPU (Central Processing Unit) and a GPU (Graphics Processing Unit) and a volatile memory that functions as a working memory of the processor.

For example, the control unit 17 generates the upload information S1 including at least a device photographing image Imd generated by the camera 15, and transmits the upload information S1 to the server device 2 via the communication unit 12. The transmission of the upload information S1 to the server device 2 may be performed when a request is received from the server device 2, or may be performed at predetermined time intervals. The upload information S1 may further include information regarding at least one of the position or the posture of the display device 1 at the time of generating the device photographing image Imd in addition to the device photographing image Imd. Further, when receiving the display information S2 from the server device 2 via the communication unit 12, the control unit 17 generates, based on the display information S2, a driving signal for driving the light source unit 10. Then, by supplying the driving signal to the light source unit 10, the control unit 17 lets the optical element 11 emit a light (also referred to as "display light") for displaying a virtual object by the light source unit 10. Thereby, the control unit 17 allows the user to visually recognize the virtual object.

Here, a supplementary description will be given of a case where the position information of the display device 1 is included in the upload information S1. In this case, for example, based on an output from a sensor such as a GPS receiver included in the state detection sensor 16, or, based on a signal received from a beacon terminal or a wireless LAN device provided in the venue, the control unit 17 identifies the position of the display device 1 to thereby include the position information of the identified display device 1 in the upload information S1. By using a known position estimation technique using an AR marker, the control unit 17 may estimate the position of the display device 1 based on the position, the inclination, and the size of a predetermined AR marker photographed in the device photographing image Imd.

The configuration of the display device 1 shown in FIG. 2 is an example, and various modifications may be applied to this configuration. For example, the display device 1 may further include a speaker for outputting sound based on the control by the control unit 17. Further, the display device 1 may be provided with an eye gaze detection camera for changing the presence or absence of displaying the virtual object or the display position of the virtual object according to the position of the user's eye gaze.

(3) Configuration of Server Device

Figure 3:
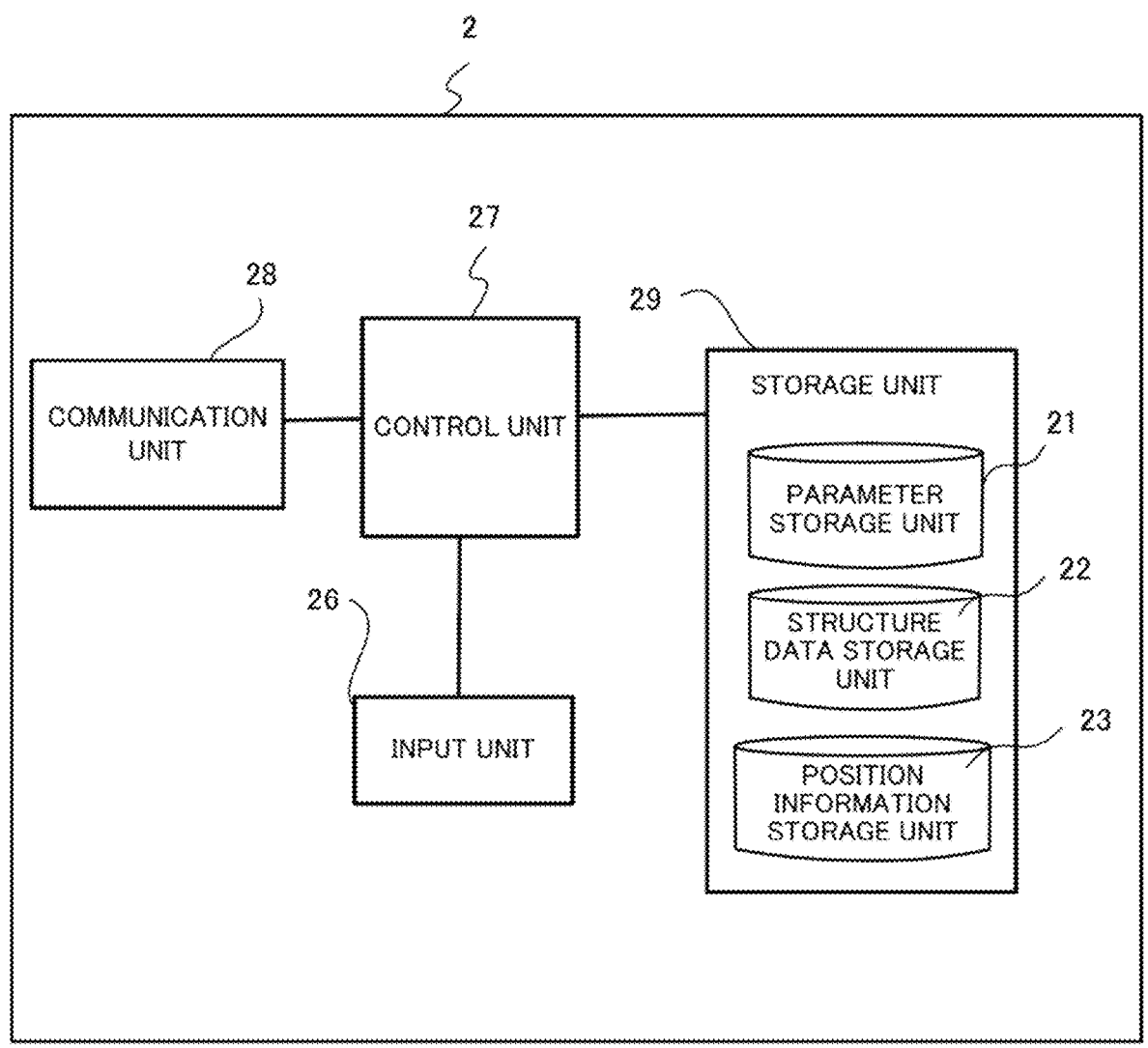
FIG. 3 is a schematic block diagram of a server device.

FIG. 3 is a schematic configuration diagram of the server device 2. The server device 2 mainly includes an input unit 26, a control unit 27, a communication unit 28, and a storage unit 29.

The control unit 27 includes, for example, one or more processors such as a CPU and a GPU, and a volatile memory that functions as a work memory, and performs overall control of the display device 1. For example, the control unit 27 determines a virtual object to be generated and displayed on each display device 1 based on a user input to the input unit 26. Further, based on the fixed camera image Imf received via the communication unit 28 from the fixed camera 3 and the upload information S1 received via the communication unit 28 from each display device 1, the control unit 27 generates coordinate transformation information (also referred to as "coordinate transformation information Ic") to be applied to each display device 1. The coordinate transformation information Ic is information relating to the coordinate transformation necessary for displaying a virtual object through each display device 1, and will be described in detail later. Hereafter, the process of generating the coordinate transformation information Ic is also referred to as "calibration process".

The storage unit 29 is a nonvolatile memory in which the control unit 27 stores various information necessary for controlling the server device 2. The storage 29 may include a removable storage medium such as a flash memory. The storage unit 29 stores a program to be executed by the control unit 27. The storage unit 29 includes a parameter storage unit 21, a structure data storage unit 22, and a position information storage unit 23.

The parameter storage unit 21 stores, in the calibration process, the position information of the structural feature points of the target structure Tag and the parameters of the identifier to be used when extracting the classification information of the structural feature points from the captured image Im. The above-described identifier is, for example, a learning model learned to output a reliability map, in the input image, of a target structural feature point of extraction for each class of the target structural feature point when the captured image Im is inputted thereto as an input image. The reliability map is a map on an image indicative of the reliability of each coordinate value of the target structural feature point. The term "coordinate value" may be a value indicative of a position in an image in one-pixel units, or may be a value indicative of a position in an image in sub-pixel units. The learning model used for learning of the identifier may be a learning model based on a neural network, or may be any other type of a learning model such as a support vector machine, or may be a combination of these. For example, when the above-described learning model is a neural network such as a convolutional neural network, the parameter storage unit 21 stores various parameters such as a layer structure, a neuron structure of each layer, the number of filters and the filter size in each layer, and the weight of each element of each filter. It is noted that the identifier is not limited to what outputs a reliability map of the target structural feature point and it may be a regression type identifier configured to output information indicative of the coordinate value, in the input image, of the target structural feature point.

The position information storage unit 23 include information regarding the position of the image acquisition device to be used in the calibration process. For example, the position information storage unit 23 stores, as the position information of the display device 1, the seat information relating to the seat used by each user of each display device 1. The seat information includes each seat number for identifying the seat assigned to each user of each display device 1, and a position information for each seat number. By referring to each seat number of each user of each display device 1 and the position information corresponding to each seat number, the control unit 27 can appropriately grasp the relative position of each display device 1. Further, the position information storage unit 23 stores the position information indicating the position of the fixed camera 3 measured in advance as the installation information of the fixed camera 3.

The position information storage unit 23 may store the latest position information of each display device 1 detected by the server device 2 as the position information of each display device 1. For example, the server device 2 estimates the position of each display device 1 by receiving a signal relating to the position of each display device 1 from a beacon terminal and a wireless LAN device provided in the venue, and then stores the estimated position information indicating the position of each display device 1 in the position information storage unit 23.

Further, in some embodiments, the position information storage unit 23 may further store information indicative of the orientation (posture) of each image acquisition device for the server device 2 to grasp the relative orientation of each image acquisition device. In this case, for example, the seat information stored in the position information storage unit 23 may include not only the position information for each seat number but also information indicative of the absolute orientation for each seat number (i.e., the orientation (posture) of the display device 1 assumed for each seat). Similarly, the position information storage unit 23 may include not only the position information of the fixed camera 3 measured in advance but also the information indicative of the orientation (posture) of the fixed camera 3 measured in advance as installation information of the fixed camera 3. In such a case that the position information and the orientation information of each display device 1 is included in the upload information S1, the position information storage unit 23 may not include the position information and the orientation information of each display device 1.

Figure 4:
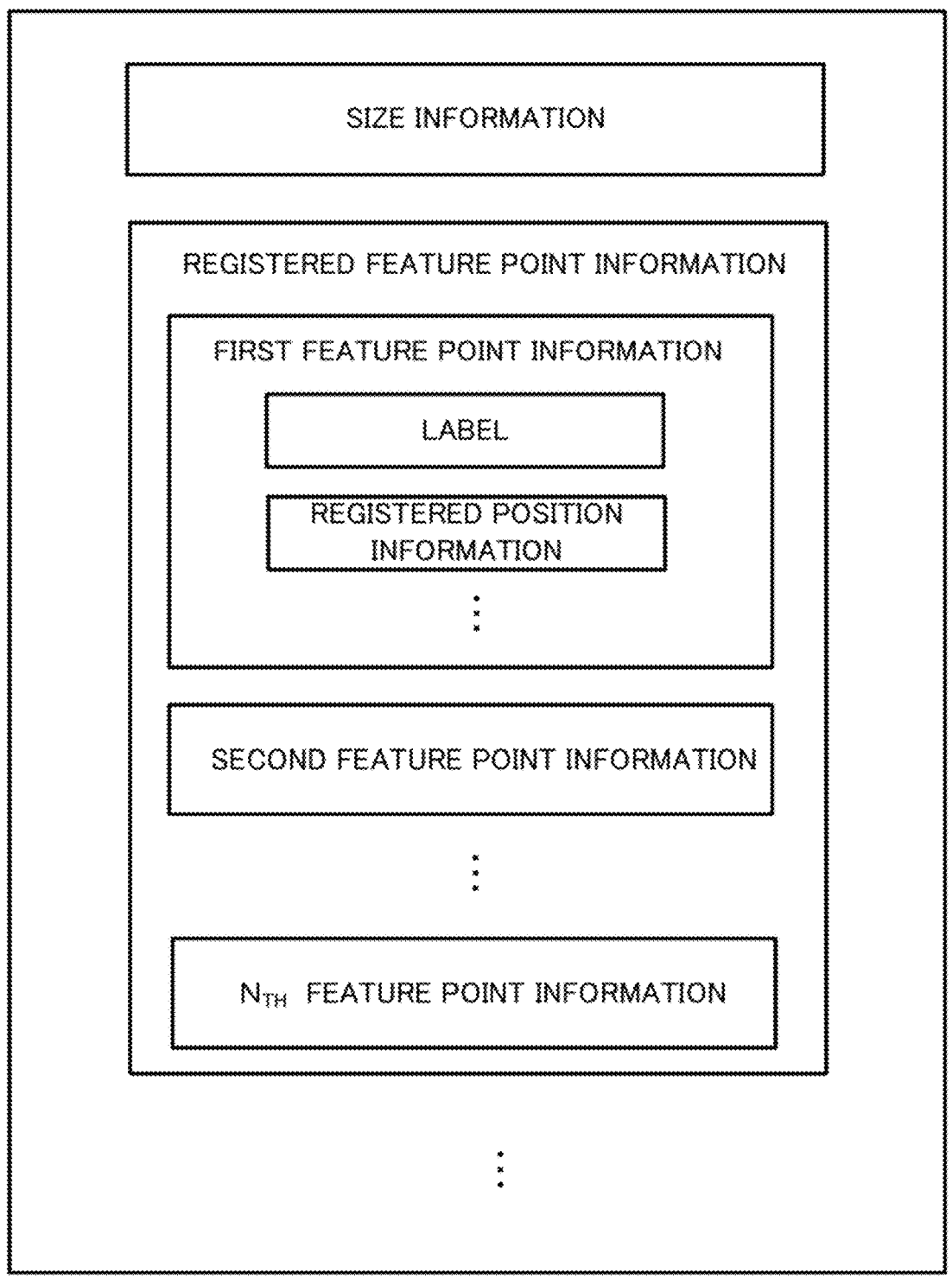
FIG. 4 illustrates an example of the data structure of structure data.

The structure data storage unit 22 stores structure data regarding the structure of the target structure Tag. FIG. 4 shows an example of a data structure of structure data. The structure data includes size information and registered feature point information. The size information is information indicative of the size of the target structure Tag. For example, the structure data of a tennis court is information indicative of the vertical and horizontal width of the court and the structure data of a theater is information indicative of the width (and height) of the stage. The size information is not limited to the information relating to the overall size of the target structure Tag, and it may be any information indicating distances among the structural feature points detected in the calibration process, as will be described later.

The registered feature point information is information regarding the structural feature points of the target structure Tag, and includes individual information measured beforehand for each structural feature point. Here, since the target structure Tag has N structural feature points (N is an integer of 3 or more), the registered feature point information includes N pieces of information (first structural feature point information to N structural feature point information) corresponding to the N structural feature points, respectively. The registered feature point information includes at least a label indicating the class of each structural feature point and registration position information indicating the position of each structural feature point. The registration position information is information indicative of coordinates in the three-dimensional coordinate system (also referred to as "structural coordinate system") with reference to the target structure Tag, wherein, for example, the position of any of the structural feature points is set to be the origin of the structural coordinate system. Thus, the structural coordinate system corresponds to the coordinate system adopted in the structure data. For example, the registered feature point information is used to calculate the parameters of the coordinate transformation between the structural coordinate system and the coordinate system (also referred to as "device coordinate system") with reference to each display device 1. For example, the device coordinate system is a three-dimensional coordinate system with each axis corresponding to the photographing direction (front direction) by the camera 15 of the display device 1 and the vertical and horizontal directions of the captured image Im, or any other three-dimensional coordinate system based on the posture of the display device 1. For example, the control unit 27 calculates the above-described parameters by associating and matching, for each label, the position information, in the device coordinate system of each display device 1, of each structural feature point extracted from the captured image Im outputted by the each display device 1 with the registered position information of the each structural feature point.

In addition, the structure data may further include information indicative of the structural feature point to be the origin in the structural coordinate system and information indicative of each direction of the three axes of the structural coordinate system, respectively.

The storage unit 29 may be an external storage device such as a hard disk connected to or built in to the server device 2, or may be a storage medium such as a flash memory. Further, the storage unit 29 may be another server device (i.e., a device that stores data to be referred to by an external device) that performs data communication with the server device 2. In this case, the storage unit 29 may be configured by a plurality of server devices to store the parameter storage unit 21, the structure data storage unit 22, and the position information storage unit 23 in a distributed manner.

(4) Functional Block

Figure 5:
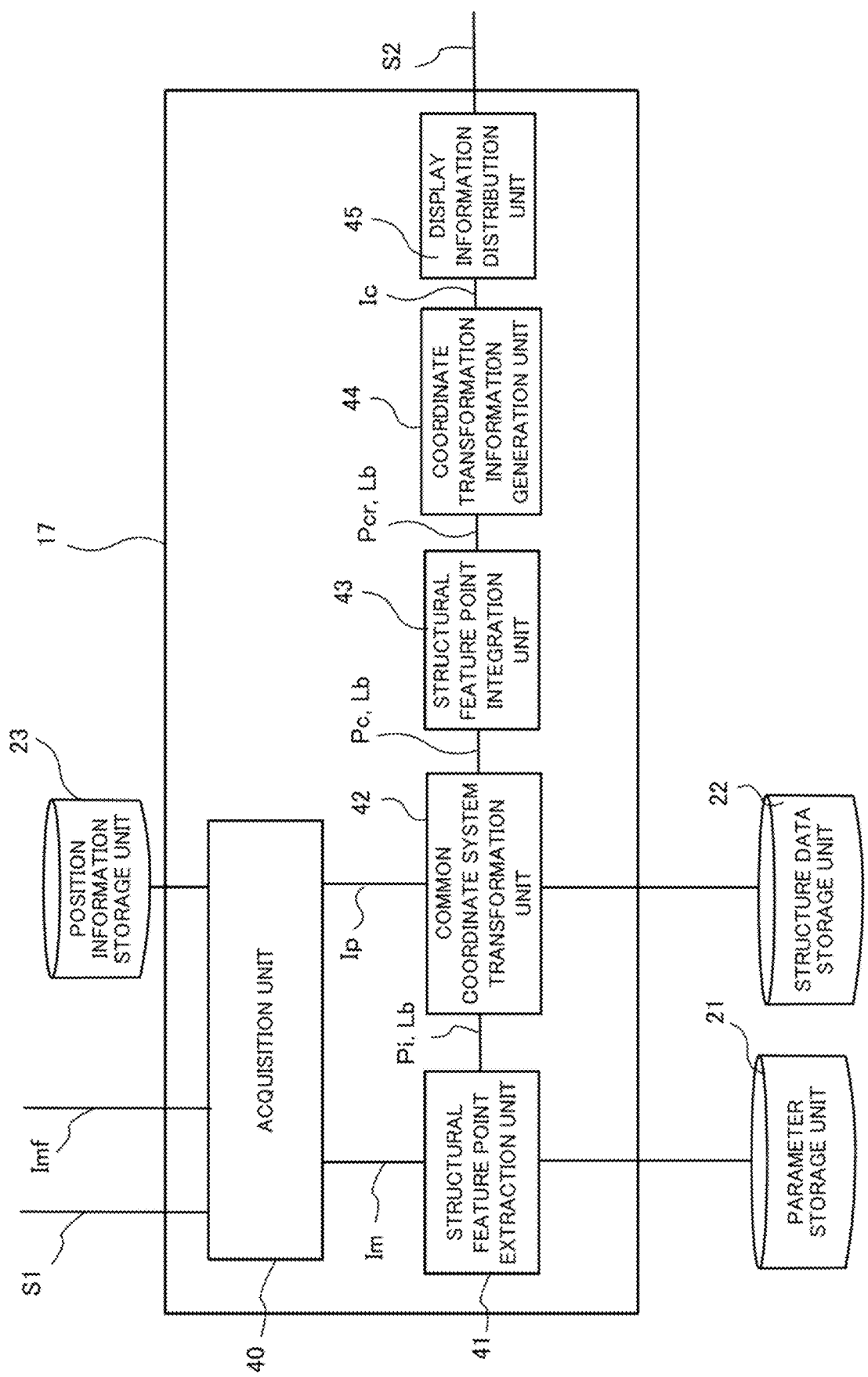
FIG. 5 is a block diagram showing a functional configuration of a control unit.

FIG. 5 is a block diagram showing a functional configuration of the control unit 27. As shown in FIG. 5, the control unit 17 functionally includes an acquisition unit 40, a structural feature point extraction unit 41, a common coordinate system transformation unit 42, a structural feature point integration unit 43, a coordinate transformation information generation unit 44, and a display information distribution unit 45.

The acquisition unit 40 acquires the captured image Im generated by each image acquisition device and information (also referred to as "positional relation information Ip") indicating the relative position (i.e., positional relation) among the image acquisition devices. In this case, by receiving, via the communication unit 28, the fixed camera image Imf and the upload information S1 including a device photographing image Imd, the acquisition unit 40 acquires the captured image Im generated by each image acquisition device. Further, by referring to the position information storage unit 23, the acquisition unit 40 generates the positional relation information Ip regarding each image acquisition device. The positional relation information Ip may be any kind of position information of each image acquisition device in a unified common coordinate system, or may be the position information after the coordinate transformation, to the common coordinate system, of the position information of each image acquisition device stored in the position information storage unit 23. In other words, the positional relation information Ip is not necessary to be information representing the absolute position of each image acquisition device (e.g., latitude, longitude, altitude), and it may be any information with which the relative position among the image acquisition devices can be identified.

When the position information of the display device 1 is included in the upload information S1, the acquisition unit 40 may generate the positional relation information Ip based on the position information of the fixed camera 3 stored in the position information storage unit 23 and the position information of each display device 1 included in the upload information S1. Further, when the acquisition unit 40 can receive, from a beacon terminal or a wireless LAN device or the like via the communication unit 28, information (e.g., information indicative of the radio intensity of each display device 1) with which the position of each display device 1 can be identified, it may generate the positional relation information Ip based on the above-mentioned information.

The structural feature point extraction unit 41 generates information regarding the structural feature points of the target structure Tag from the captured image Im of each image acquisition device supplied from the acquisition unit 40. Specifically, the structural feature point extraction unit 41 outputs, to the common coordinate system transformation unit 42, sets of a coordinate value (also referred to as "intra-image coordinate value Pi") of each structural feature point in the captured image Im and a label (also referred to as "label Lb") indicating the class of the each structural feature point. In this case, the structural feature point extraction unit 41 configures the identifier based on the parameters extracted from the parameter storage unit 21, and generates a plurality of sets of the intra-image coordinate value Pi and the label Lb based on the output result of the identifier obtained by inputting each captured image Im to the identifier. Here, the identifier is a learning model learned to output, for each of the classes of the structural feature points, information regarding the position of the structural feature point in the image when the captured image Im is inputted thereto.

Here, a method for determining the intra-image coordinate value Pi will be supplementally described. For example, when the reliability map in the image for each of the classes of the structural feature points is outputted from the identifier, the structural feature point extraction unit 41 determines the intra-image coordinate value Pi for each of the classes of the structural feature points to be the coordinate value at which the reliability becomes the maximum for the each of the classes. Then, the structural feature point extraction unit 41 outputs the label Lb indicating each class and the corresponding intra-image coordinate value Pi to the common coordinate system transformation unit 42. If the maximum value of the reliability for a certain class is less than a predetermined threshold value, the structural feature point extraction unit 41 may not output the label Lb corresponding to the certain class and the corresponding intra-image coordinate value Pi.

On the other hand, if a coordinate value in the image for each of the classes of the structural feature points is outputted from the identifier, the structural feature point extraction unit 41 determines the intra-image coordinate value Pi to be the coordinate value outputted by the identifier and outputs it together with the label Lb indicating the each of the classes to the common coordinate system transformation unit 42. In the case where the coordinate value outputted by the identifier is a normalized value so as not to depend on the image size, the structural feature point extraction unit 41 calculates the intra-image coordinate value Pi by multiplying the coordinate value outputted by the identifier by the image size of the captured image Im.

Based on the positional relation information Ip of each image acquisition device, the common coordinate system transformation unit 42 converts the intra-image coordinate value Pi extracted by the structural feature point extraction unit 41 from the image outputted by each image acquisition device to a coordinate value (also referred to as "individual coordinate value Pc") in a coordinate system (also referred to as "common coordinate system") that is commonly-used among the image acquisition devices. The common coordinate system may be a structural coordinate system or may be a coordinate system with reference to the position and orientation of any of the display devices 1. Details of the processing performed by the common coordinate system transformation unit 42 will be described later.

The structural feature point integration unit 43 performs the process of integrating individual coordinate values Pc in the common coordinate system for each of the classes (i.e., per label) of the structural feature points. In this case, the structural feature point integration unit 43 determines a representative position, in the common coordinate system, of the structural feature point for each label using a statistical technique. Then, the structural feature point integration unit 43 supplies sets of a representative coordinate value (also referred to as a "representative coordinate value Pcr") of a structural feature point in the common coordinate system and the label Lb indicating the class of the structural feature point to the coordinate transformation information generation unit 44. As will be described later, the structural feature point integration unit 43 supplies the coordinate transformation information generation unit 44 with the representative coordinate values Pcr at least three structural feature points that are not linearly arranged and their labels Lb. On such an assumption that there is one common axis among the common coordinate system, structural coordinate system, and each device coordinate system, the information regarding only two structural feature points may be transmitted to the coordinate transformation information generation unit 44.

The coordinate transformation information generation unit 44 generates the coordinate transformation information Ic necessary for displaying a virtual object on each display device 1 based on the representative coordinate value Pcr for each of the labels Lb of the structure feature points outputted by the structure feature point integration unit 43. For example, the coordinate transformation information generation unit 44 generates the coordinate transformation information Ic by associating and matching, for each label, the intra-image coordinate value Pi (i.e., the detected position of the structural feature point in the device coordinate system with respect to each display device 1) calculated by the structural feature point extraction unit 41 and the representative coordinate value Pcr. The coordinate transformation information Ic is information indicative of parameters relating to the coordinate transformation between the device coordinate system of each display device 1 and the structural coordinate system. The coordinate transformation information Ic is, for example, a combination of rotation matrix and translation vector generally used to perform coordinate transformation between three-dimensional spaces. The coordinate transformation information generation unit 44 generates the coordinate transformation information Ic adapted for each display device 1, respectively.

The display information distribution unit 45 acquires information (also referred to as "display designation information") which designates a virtual object (i.e., original image) to be superimposed on the view and the display position of the virtual object, and then reflects the coordinate transformation information Ic in the display designation information to thereby generate the display information S2. This virtual object may be information (two-dimensional drawing information) for two-dimensional object drawing, or it may be information (three-dimensional drawing information) for three-dimensional object drawing. Then, the display information distribution unit 45 transmits the generated display information S2 to the corresponding display device 1. Then, the control unit 17 of the display device 1 which has received the display information S2 generates, based on the display information S2 received from the server device 2, a driving signal which instructs the driving timing of the light source(s) (e.g., light sources corresponding to R, G, B) of the light source unit 10 and the amount of light, and supplies the generated driving signal to the light source unit 10.

The description of the process of generating information for controlling the light source unit 10 from the display designation information is an example, any method applied in an existing AR product or the like may be adopted. Examples of literatures that disclose such a technique include JP2015-116336A and JP2016-525741A. As shown in these literatures, in further consideration of the user's eye gaze detection results and the like, the server device 2 or the display device 1 may generate information for controlling the light source unit 10 so that the virtual object is appropriately visually recognized.

Each component of the acquisition unit 40, the structural feature point extraction unit 41, the common coordinate system transformation unit 42, the structural feature point integration unit 43, the coordinate transformation information generation unit 44, and the display information distribution unit 45 described in FIG. 7 can be realized, for example, by the control unit 17 executing a program. More specifically, each component can be realized by the control unit 17 executing the program stored in the storage unit 14. In addition, the necessary programs may be recorded in any nonvolatile recording medium and installed as necessary to realize each component. Each of these components is not limited to being implemented by software using a program, and may be implemented by any combination of hardware, firmware, and software. Each of these components may also be implemented using user programmable integrated circuitry, such as, for example, FPGA (Field-Programmable Gate Array) or a microcomputer. In this case, the integrated circuit may be used to realize a program functioning as each of the above-described components. Thus, each component may be implemented in hardware other than a processor. The above is the same in other example embodiments to be described later.

(5) Learning of Identifier

Here, learning for generating parameters of the identifier to be stored in the parameter storage unit 21 will be supplementally described.

Figure 6:
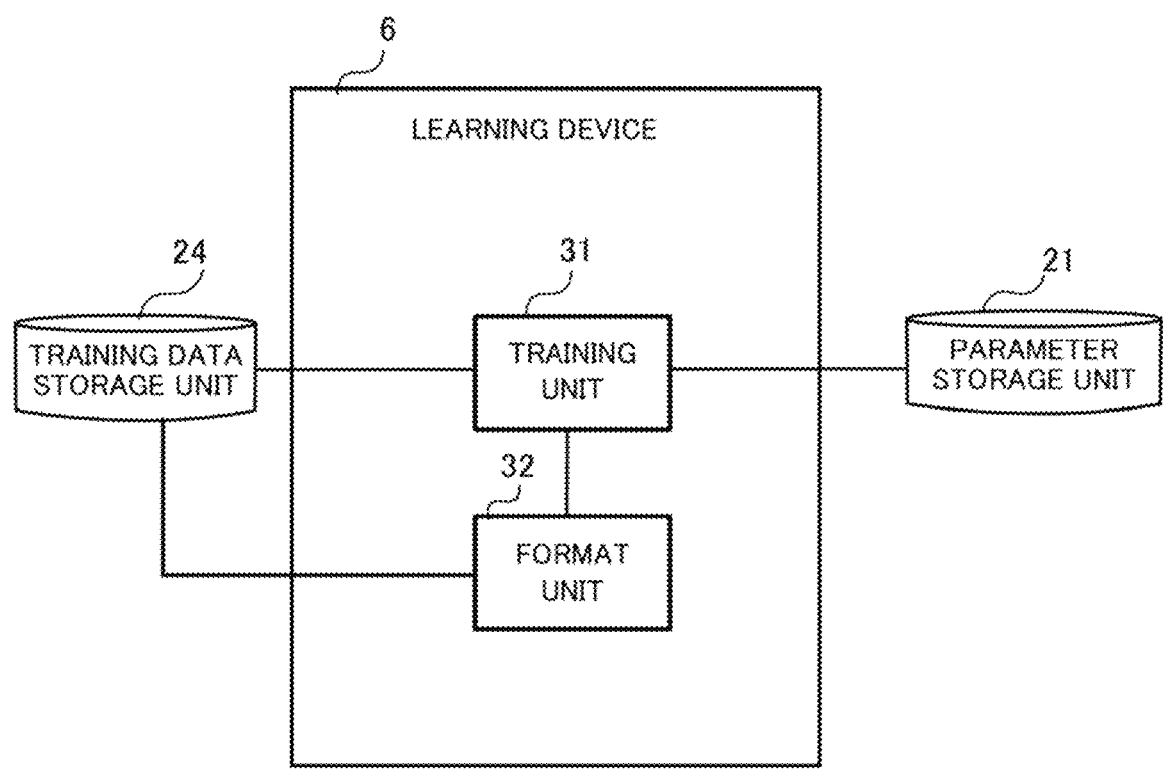
FIG. 6 illustrates a schematic configuration of a learning device for generating parameters of an identifier to be stored in a parameter storage unit.

FIG. 6 shows a schematic configuration of the learning device 6 that generates parameters of an identifier to be stored in the parameter storage unit 21. The learning device 6 may be a device capable of referring to the training data storage unit 24. It may be the server device 2 or any device other than the server device 2 (for example, a personal computer or the like). The learning device 6 performs training for generating parameters of the identifier to be stored in the parameter storage unit 21 with reference to the training data storage unit 24 at the previous stage of the service provision by the display system 100.

The training data storage unit 24 stores multiple sets of a training image in which the target structure Tag is photographed and correct answer data indicating the position and label of each structural feature point in the training image. In this case, in some embodiments, training images in which the target structure Tag existing in various environments (e.g., tennis courts corresponding to various types of the surface if the target structure Tag is a tennis court) is photographed may be stored in the training data storage unit 24. Similarly, training images obtained by photographing the target structure Tag in various imaging environments (e.g., environments in which the presence or absence of illumination or the degree thereof are different) may be stored in the training data storage unit 24. By using such training images, it becomes possible to suitably learn the identifier that is robust to variations in the target structure Tag and changes in the imaging environment.

Further, the learning device 6 functionally includes a training (learning) unit 31 and a format unit 32.

The format unit 32 converts the correct answer data stored in the training data storage unit 24 to data in a predetermined format. For example, when the identifier is learned to output a reliability map for the structural feature point for each label, the format unit 32 generates the reliability map indicating the normal distribution of the reliabilities in which the coordinate position of the structural feature point indicated by the correct answer data become the maximum value. In contrast, when the identifier is learned to output the coordinate value of the structural feature point for each label, the format unit 32 converts the coordinate position of the structural feature point indicated by the correct answer data into two-dimensional coordinate values normalized to the range of 0 to 1 that is independent of the image size.

The training unit 31 performs training of the learning model (identifier) based on the training images and the data in the appropriate format which the correct answer data is converted by the format unit 32. In this case, for example, the training unit 31 determines the parameters of the identifier such that an error (loss) between the data outputted by the identifier when the training image is inputted to the identifier and the data indicating the correct answer supplied from the format unit 32 is minimized. The algorithm for determining the parameters described above to minimize loss may be any training algorithm used in machine learning, such as a gradient descent method and an error back-propagation method. Then, the training unit 31 stores the parameters of the learned identifier in the parameter storage unit 21.

The display device 1 configures the identifier, in the calibration process, by using the parameters of the identifier that is learned as described above. In this case, the identifier performs the extraction of accurate structural feature points regardless of the variation of the target structure Tag and the change in the imaging environment by being trained using the training data corresponding to the target structure Tag in variations and various imaging environments.

(6) Concrete Example of Structural Feature Point Extraction

Next, a specific example of extraction of structural feature points executed by the structural feature point extraction unit 41 will be described.

Figure 7A:
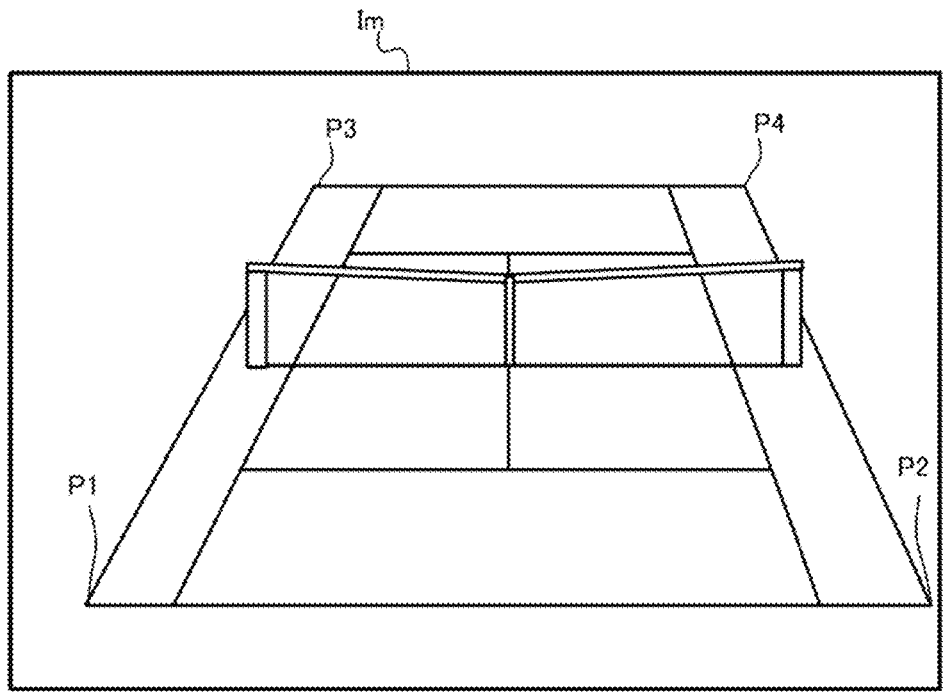
FIG. 7A illustrates an example of a captured image of a tennis court.
Figure 7B:
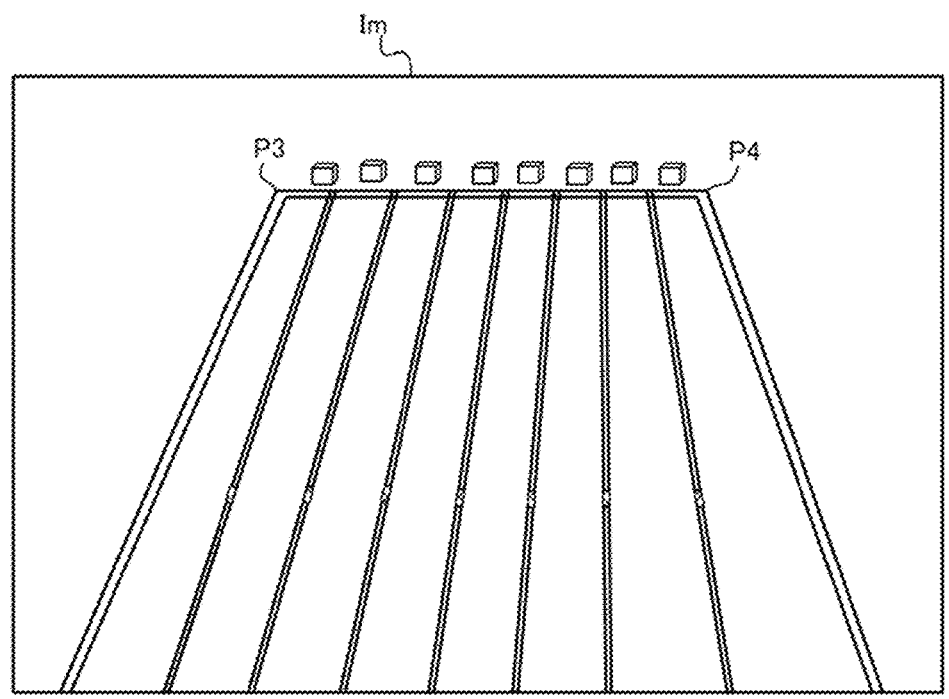
FIG. 7B illustrates an example of a captured image of a swimming pool for competition.

FIGS. 7A and 7B each shows an example of a captured image Im generated by the display device 1A shown in FIG. 1. The captured image Im shown in FIG. 7A indicates a tennis court as the target structure Tag, and the captured image Im shown in FIG. 7B indicates a swimming pool for competition as the target structure Tag.

Figure 8A:
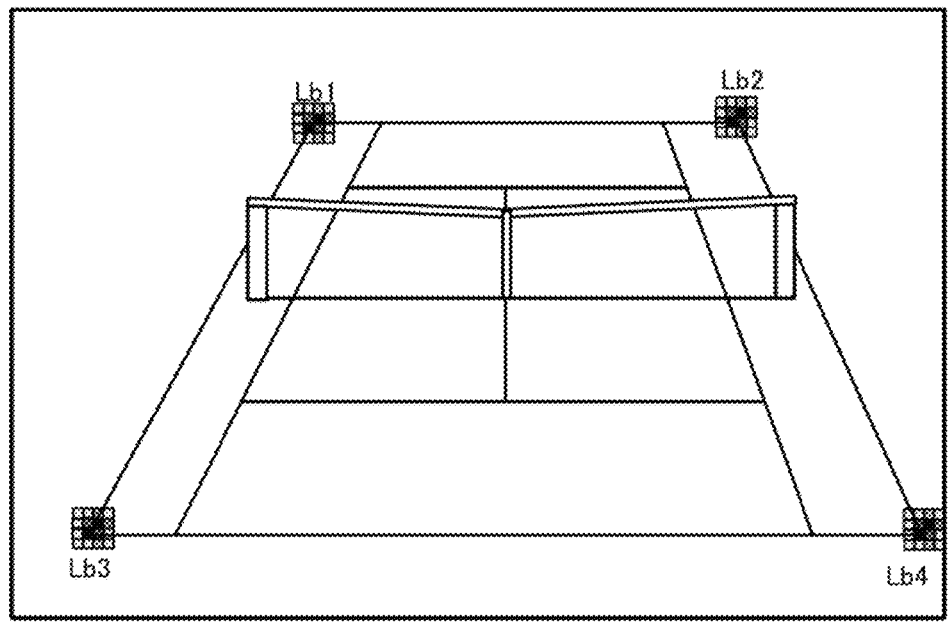
FIG. 8A illustrates the captured image in FIG. 7A on which a reliability map of the structural feature points outputted by the identifier in units of a class is superimposed.
Figure 8B:
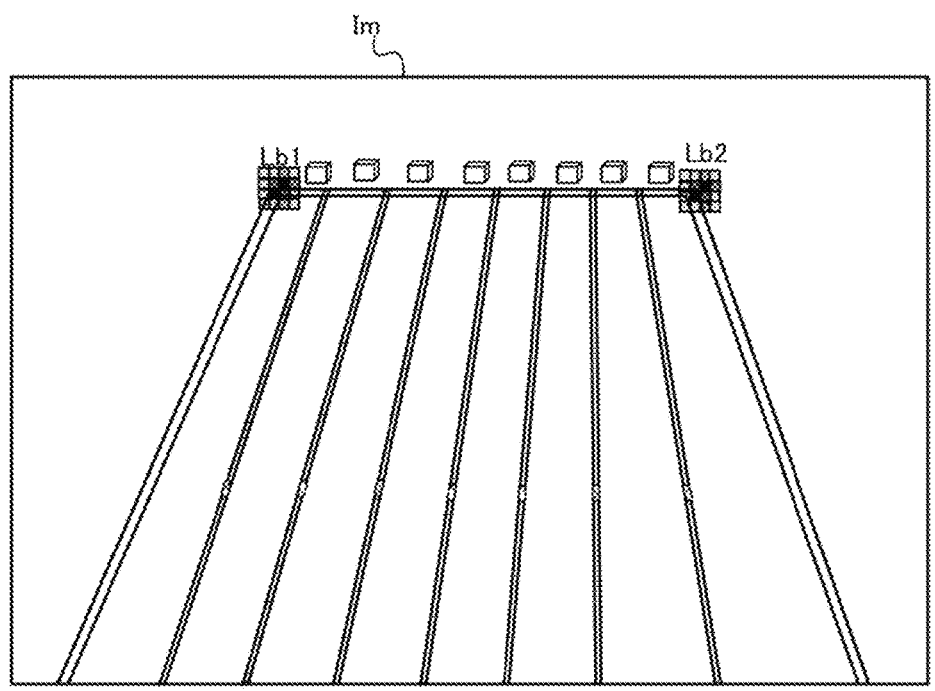
FIG. 8B illustrates the captured image in FIG. 7B on which a reliability map of the structural feature points outputted by the identifier in units of a class is superimposed.

FIG. 8A and FIG. 8B each shows the captured image Im with clear indication of the reliability map for each of the classes (labels) of the structural feature points outputted by the identifier based on the captured images Im shown in FIG. 7A and FIG. 7B, respectively. For convenience of explanation, FIGS. 8A and 8B illustrates the reliability maps only for the main partial areas (here, 3 by 3 or 4 by 4 rectangular pixel areas) where the reliability is not 0. Each pixel in the reliability maps shall indicate that the darker the pixel is, the higher the reliability becomes. The labels "Lb1" to "Lb4" are labels indicating the classes corresponding to the structural feature points P1 to P4, respectively. In FIG. 8A and FIG. 8B, although the reliability maps of all structural feature points are displayed in one image, actually, the identifier outputs the reliability map per label.

Here, a supplementary description will be given of the effect of performing the calibration process using the captured images Im acquired by a plurality of image acquisition devices. The captured images Im acquired by the image acquisition devices are taken from different positions according to the positions of the respective image acquisition devices, and the detection accuracy of the structural feature points by using the captured image Im is different depending on the photographing position. For example, in the example of FIG. 7A, since the structural feature point P1 is present at the closest position from the display device 1A, it is assumed that the detection accuracy is higher than that of the structural feature points P3 and P4. On the other hand, since the structural feature point P2 is present at the edge portion of the captured image Im, it is assumed that the structural feature point P2 is more susceptible from the influence by lens distortion than the other structural feature points. Further, in the example shown in FIG. 7B, it is impossible to image some structural feature points from the display device 1A. Considering the above, the server device 2 according to the first example embodiment performs the calibration process using the captured images Im acquired by multiple image acquisition devices present at different locations, thereby generating accurate coordinate transformation information Ic.

(7) Calculation of Individual Coordinate Value in Common Coordinate System

Figure 9:
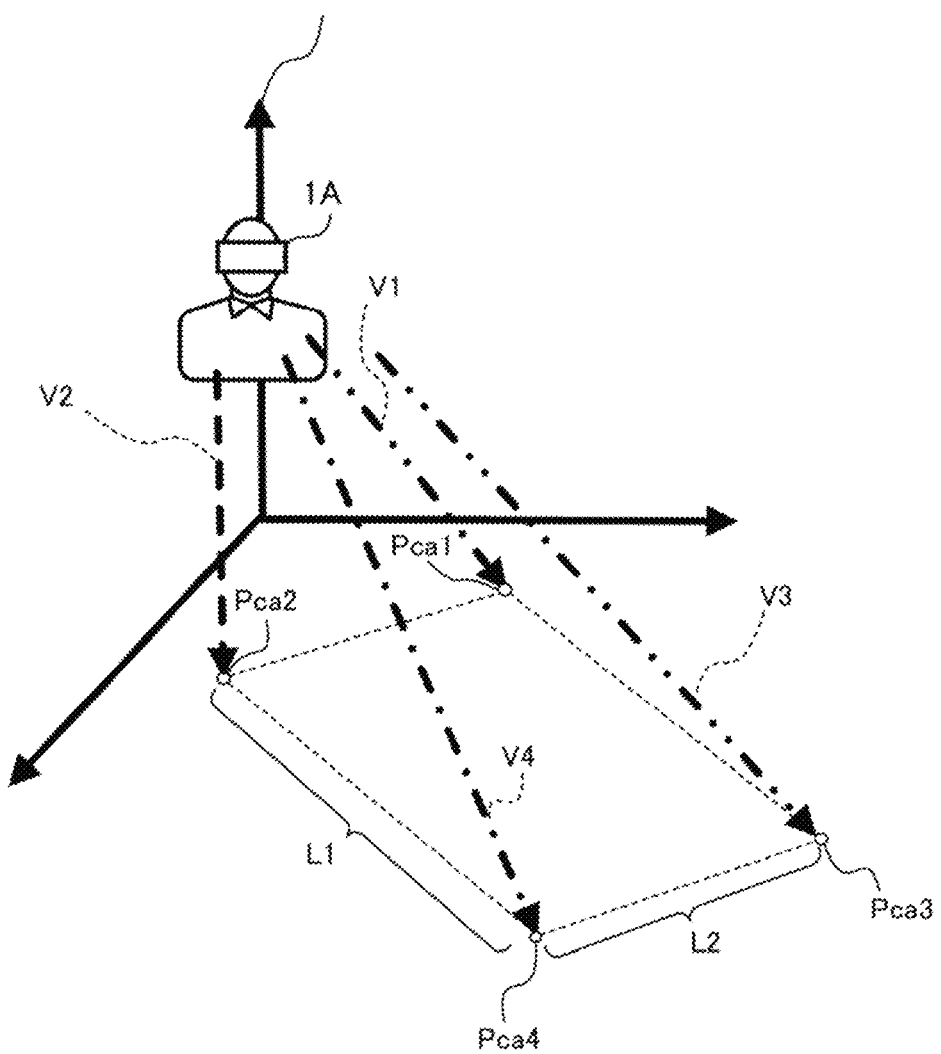
FIG. 9 is a diagram of the common coordinate system on which individual coordinate values in the common coordinate system corresponding to each structural feature point are plotted.

Next, a description will be given of a specific example of the calculation process of the individual coordinate value Pc in the common coordinate system by the common coordinate system transformation unit 42. FIG. 9 is a diagram of the common coordinate system on which individual coordinate values Pc (Pca1 to Pca4) in the common coordinate system corresponding to structural feature points P1 to P4 are plotted based on the captured image Im generated by the display device 1A.

First, the common coordinate system transformation unit 42 determines vectors (also referred to as "structural feature point vectors") in the common coordinate system based on the intra-image coordinate values Pi corresponding to the respective structural feature points P1 to P4 that are extracted by the structural feature point extraction unit 41 from the captured image Im of the display device 1A. The vectors "V1" to "V4" in FIG. 9 indicate the structural feature point vectors determined based on the intra-image coordinate values Pi corresponding to the structural feature points P1 to P4, respectively.

Here, a specific example of a method of setting a structural feature point vector. First, a method of determining the starting point of the structural feature point vector will be described. The common coordinate system transformation unit 42 determines the start points of the structural feature point vectors of the structural feature points P1 to P4 detected by the display device 1A based on the positional relation information Ip indicating the relative position of the display device 1A. In this case, the common coordinate system transformation unit 42 determines the start point of each structural feature point vector of the structural feature points P1 to P4 based on the captured image Im acquired by each image acquisition device so that the relative positional relation among the image acquisition devices based on the positional relation information Ip of each image acquisition device is kept also in the common coordinate system. In this case, the position of one image acquisition device may be set to be the origin of the common coordinate system, or the center of gravity of the positions of the image acquisition devices may be set to be the origin of the common coordinate system.

Next, a method of determining the direction of the structural feature point vector will be described. In general, the direction of the photographed position indicated by pixel is different depending on the pixel position in the captured image Im. Therefore, the common coordinate system transformation unit 42 determines the direction of the structural feature point vector, based on the intra-image coordinate value Pi indicating the pixel position in the captured image Im. In this case, for example, the storage unit 29 stores a map which indicates the direction of the structural feature point vector for each pixel position, and the common coordinate system transformation unit 42 refers to the map to determine the direction of the structural feature point vector from each intra-image coordinate value Pi.

Further, considering that the direction (posture) of photographing the target structure Tag is different for each image acquisition device, the common coordinate system transformation unit 42 determines the direction (i.e., the front direction of the image acquisition device) of the center pixel of the captured image Im in accordance with each image acquisition device which acquired the captured image Im. For example, the acquisition unit 40 recognizes the relative orientation of each image acquisition device by acquiring the information indicative of the orientation of each image acquisition device from the upload information S1 or the position information storage unit 23, and supplies the positional relation information Ip including the recognition result to the common coordinate system transformation unit 42. Then, the common coordinate system transformation unit 42 determines the direction, in the common coordinate system, of the center pixel of each captured image Im so that the relative relation among the orientations of the image acquisition devices indicated by the positional relation information Ip is kept in the relative relation among the directions of the center pixels of the captured images captured by the image acquisition devices. In this case, the orientation of one image acquisition device may be set to coincide with one axis of the common coordinate system. The length of the structural feature point vector is not specified.

Next, the common coordinate system transformation unit 42 specifies the position of each structural feature point of the target structure Tag in the common coordinate system based on each specified structural feature point vector and the size information of the target structure Tag. In the example shown in FIG. 9, the common coordinate system transformation unit 42 refers to the size information of the structure data and recognizes the width "L1" in the long direction and the width "L2" in the short direction of the target structure Tag. In this instance, there are individual coordinate values Pca1 to Pca4 in the common coordinate system on extended lines of the structural feature point vectors V1 to V4, respectively. The distance between the individual coordinate values Pca2 and Pca4 in the common coordinate system and the distance between the individual coordinate values Pca1 and Pca3 in the common coordinate system are equal to the width L1, and the distance between the individual coordinate values Pca1 and Pca2 in the common coordinate system and the distance between the individual coordinate value Pca3 and Pca4 in the common coordinate system is equal to the width L2. Therefore, the common coordinate system transformation unit 42 calculates the individual coordinate values Pc (Pca1 to Pca4) in the common coordinate system of the structural feature points P1 to P4 satisfying above-mentioned conditions.

Figure 10:
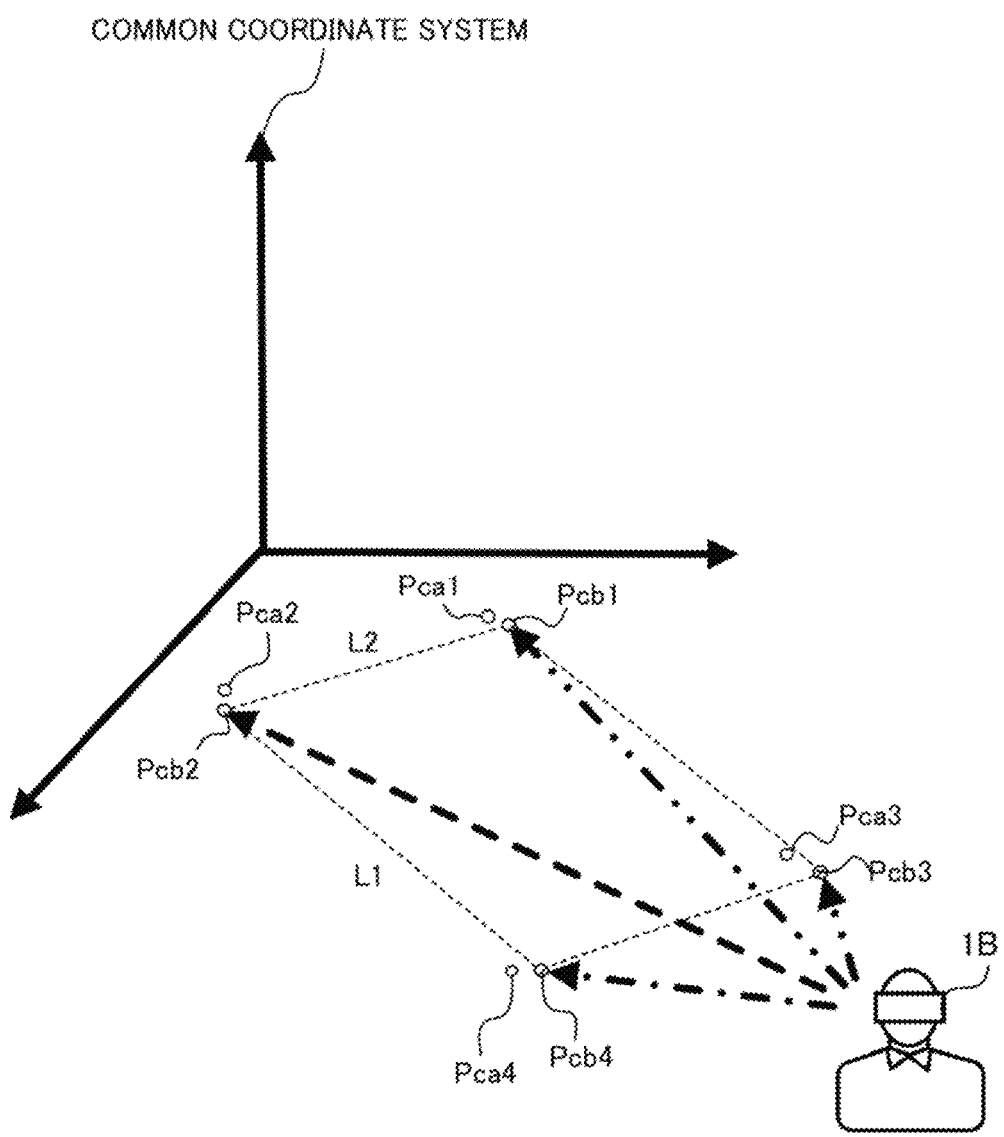
FIG. 10 is a diagram of the common coordinate system on which the individual coordinate values in the common coordinate system corresponding to each structural feature point are plotted.

FIG. 10 is a diagram of the common coordinate system on which individual coordinate values Pc (Pca1 to Pca4) in the common coordinate system corresponding to structural feature points P1 to P4 are plotted based on the captured image Im generated by the display device 1B. The common coordinate system transformation unit 42 determines the start point and the direction of each structural feature point vector of the structural feature points P1 to P4 based on: the intra-image coordinate values Pi of the structural feature points P1 to P4 extracted from the captured image Im acquired by the display device 1B; and the positional relation information Ip indicating the relative position of the display device 1B. Then, based on the size information of the target structure Tag, the common coordinate system transformation unit 42 specifies the individual coordinate values Pcb1 to Pcb4 in the common coordinate system that exist on the extended lines of the structural feature point vectors of the structural feature points P1 to P4, respectively.

Furthermore, in the same way, the common coordinate system transformation unit 42 converts the intra-image coordinate values Pi of the structural feature points P1 to P4 extracted from the captured images Im acquired by all other image acquisition devices (in the example of FIG. 1, the display devices 1C and 1D and the fixed camera 3) into the individual coordinate values Pc in the common coordinate system. Then, the structural feature point integration unit 43 determines the representative coordinate value Pcr for each of the structural feature points P1 to P4.

Figure 11:
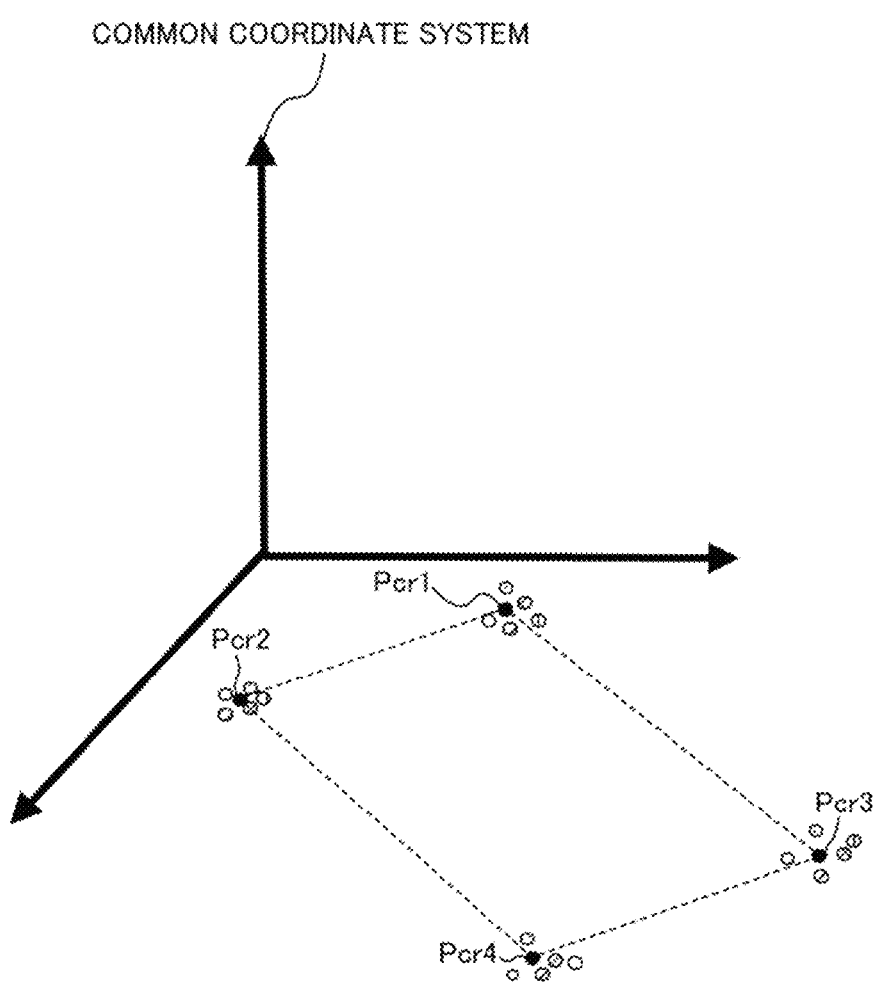
FIG. 11 is a diagram of the common coordinate system on which the individual coordinate values in the common coordinate system and the representative coordinate value corresponding to each structural feature point are plotted.

FIG. 11 is a diagram of the common coordinate system on which the individual coordinate values Pc in the common coordinate system into which the intra-image coordinate values Pi extracted from the captured images Im of all the image acquisition devices and the representative coordinate values Pcr (Pcr1 to Pcr4), which are determined by the individual coordinate values Pc in the common coordinate system, of the structural feature points P1 to P4. For each of the structural feature points P1 to P4, the structural feature point integration unit 43 determines the representative coordinate value Pcr using a statistical method on the basis of the individual coordinate values Pc in the common coordinate system corresponding to all the image acquisition devices. A specific determination method of the representative coordinate value Pcr will be described in detail with reference to a flowchart shown in FIG. 13.

(8) Processing Flow (8-1) Overview

Figure 12:
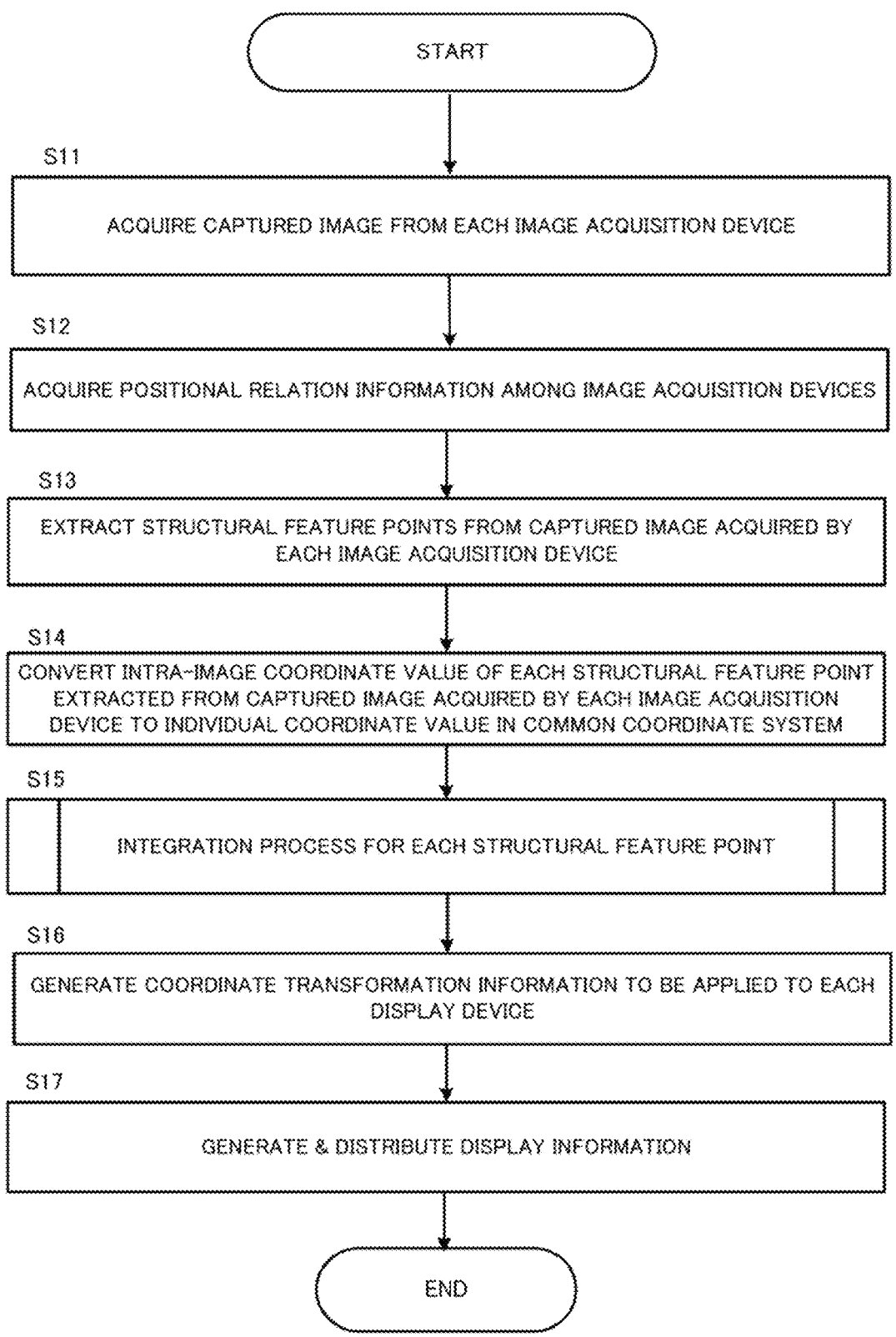
FIG. 12 is an example of a flowchart showing an outline of the process to be executed by the control unit of the server device in the first example embodiment.

FIG. 12 is an example of a flowchart illustrating an outline of processing performed by the control unit 27 of the server device 2 in the first example embodiment. The control unit 27 of the server device 2 repeatedly executes the processing of the flowchart shown in FIG. 12.

First, the acquisition unit 40 of the control unit 27 acquires the captured image Im from each image acquisition device via the communication unit 28 (step S11). Specifically, the acquisition unit 40 acquires the upload information S1 including the device photographing image Imd from each display device 1 and acquires the fixed camera image Imf from the fixed camera 3. It is noted that in such a venue at which the fixed camera 3 is not provided, it is sufficient for the acquisition unit 40 to execute only the acquisition of the upload information S1 from each display device 1.

Further, the acquisition unit 40 acquires the positional relation information Ip that is position information with which the relative position of each image acquisition device (display devices 1 and the fixed camera 3) is identified (step S12). In this case, for example, the acquisition unit 40 generates the positional relation information Ip based on the position information (including the information indicative of the position specified based on the seat) of each image acquisition device registered in the position information storage unit 23, or, based on the position information included in the upload information S1 transmitted respectively from the image acquisition devices.

Next, the structural feature point extraction unit 41 extracts the structural feature points from each captured image Im acquired by each image acquisition device (step S13). Specifically, the structural feature point extraction unit 41 configures the identifier based on the parameters acquired from the parameter storage unit 21, and inputs each captured image Im to the identifier to thereby acquire each set of the intra-image coordinate value Pi and the label Lb.

Then, the common coordinate system transformation unit 42 converts the intra-image coordinate value Pi of each structural feature point extracted from the captured image Im of each image acquisition device into the individual coordinate value Pc in the common coordinate system (step S14). In this case, for each image acquisition device, the common coordinate system transformation unit 42 converts, based on the size information and the positional relation information Ip and the like, the intra-image coordinate value Pi of each structural feature point into the individual coordinate value Pc in the common coordinate system.

Then, for each structural feature point, the structural feature point integration unit 43 performs integration process of the individual coordinate values Pc in the common coordinate system calculated by the structural feature point integration unit 43 (step S15). Thereby, the structural feature point integration unit 43 calculates the representative coordinate value Pcr for each structural feature point. Details of step S15 will be described later.

Then, the coordinate transformation information generation unit 44 generates the coordinate transformation information Ic to be applied to each display device 1 on the basis of the representative coordinate value Pcr calculated for each structural feature point through the integration process at step S15 (step S16). The coordinate transformation information Ic is described in detail in the section "(9) Coordinate Transformation Information".

Then, the display information distribution unit 45 generates the display information S2 for each display device 1, and transmits the generated display information S2 to each of the target display device 1 via the communication unit 28 (step S17). In this case, the display information distribution unit 45 applies the coordinate transformation information Ic to the device coordinate system of each display device 1 when generating the display information S2 to be transmitted to each display device 1. Thereby, the server device 2 can suitably generate the display information S2 so that the virtual object can be positioned appropriately with respect to the target structure Tag for each display device 1.

(8-1) Integration Process Per Structural Feature Point

Figure 13:
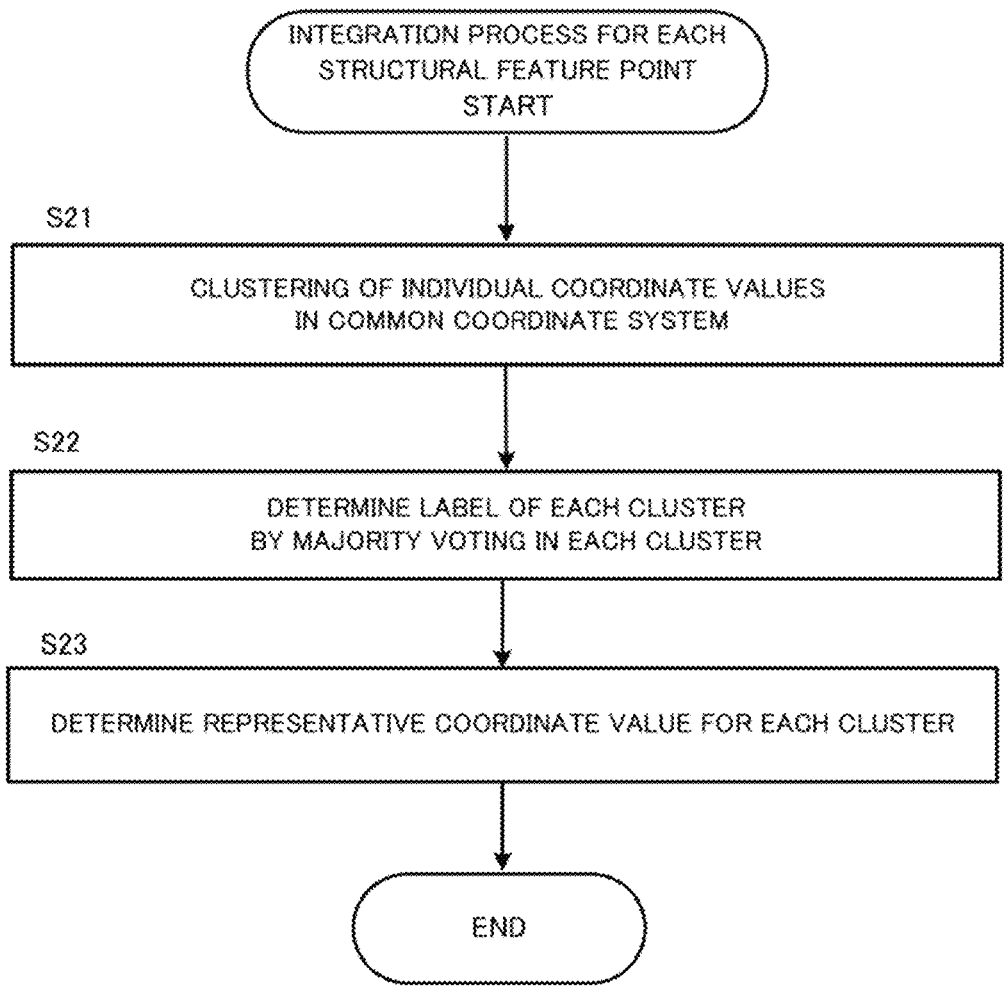
FIG. 13 is an example of a flowchart showing the integration process of the structural feature points.

FIG. 13 is an example of a flowchart showing the procedure of the integration process (i.e., the calculation processing of the representative coordinate value Pcr) for each structural feature point to executed by the structural feature point integration unit 43 at step S15 in FIG. 12.

First, the structural feature point integration unit 43 clusters the individual coordinate values Pc in the common coordinate system extracted from the captured images Im acquired by the image acquisition devices calculated by the common coordinate system conversion unit 42 (step S21). In this case, the structural feature point integration unit 43 ignores the label Lb corresponding to each individual coordinate value Pc in the common coordinate system and performs the clustering. In this case, the structural feature point integration unit 43 determines the clusters of the individual coordinate values Pc in the common coordinate system using any non-hierarchical clustering method such as the k-means method (where k is set to the number of structural feature points in this case) or hierarchical clustering method. In this case, the structural feature point integration unit 43 forms the number of clusters equal to the number (four in FIG. 1) of the structural feature points.

Next, the structural feature point integration unit 43 determines the label (i.e., class of each structural feature point) of each cluster by majority voting in each cluster (step S22). In this case, the structural feature point integration unit 43 refers to the label Lb corresponding to the individual coordinate values Pc in the common coordinate system in each cluster, and calculates a frequency distribution of the labels for the each cluster, and determines that the label having the highest frequency in the each cluster is the label of the each cluster.

In this case, in some embodiments, the structural feature point integration unit 43 considers the reliability calculated when the structural feature point extraction unit 41 extracts the intra-image coordinate value Pi from the captured image Im as the reliability of the individual coordinate value Pc in the common coordinate system corresponding to the intra-image coordinate value Pi, and uses the reliability as the weight of the vote. In this case, the structural feature point integration unit 43 calculates the sum of the reliabilities of the individual coordinate values Pc in the common coordinate system in each cluster for each label, and determines the label of the each cluster to be the label with the highest sum of the each cluster. It is noted that the accurate information of measured position and posture of the fixed camera 3 is stored in the position information storage unit 23 in advance, and the fixed camera 3 is installed in a position easy to photograph the target structure Tag. Therefore, the reliability of the intra-image coordinate value Pi calculated from the captured image Im acquired by the fixed camera 3 is estimated to be high. Therefore, the structural feature point integration unit 43 may set the reliability of the intra-image coordinate value Pi calculated from the captured image Im acquired by the fixed camera 3 to a value (e.g., a maximum value) higher than the reliability of the intra-image coordinate value Pi calculated from the captured image Im of each display device 1.

Next, the structural feature point integration unit 43 determines the representative coordinate value Pcr for each structural feature point (i.e., for each label) from the individual coordinate values Pc in the common coordinate system for each cluster (step S23). In this case, the structural feature point integration unit 43 calculates the center of gravity of the individual coordinate values Pc in the common coordinate system for each cluster as the representative coordinate value Pcr of the label corresponding to the each cluster.

In this case, in some embodiments, the structural feature point integration unit 43 may exclude such an individual coordinate value Pc in the common coordinate system serving as an outlier from the individual coordinate values Pc in the common coordinate system to be used for calculating the center of gravity determined as the representative coordinate value Pcr. For example, when detecting an individual coordinate value Pc in the common coordinate system separated from the center of gravity by a predetermined distance or more, the structural feature point integration unit 43 excludes the detected individual coordinate value Pc in the common coordinate system as an outlier and recalculates the center of gravity without using the outlier, and determines the representative coordinate value Pcr to be the center of gravity calculated without using the individual coordinate value Pc in the common coordinate system serving as the outlier. Instead of or in addition to this example, if there is an individual coordinate value Pc in the common coordinate system corresponding to a label Lb that is different from the label determined by voting at step S22, the structural feature point integration unit 43 may regard the individual coordinate value Pc in the common coordinate system as an outlier and exclude it from the targets of the center of gravity calculation.

In other embodiments, the structural feature point integration unit 43 may determine the representative coordinate value Pcr to be a center of gravity calculated with the weighted individual coordinate value Pc in the common coordinate system. In this case, in the first example, the structural feature point integration unit 43 determines the weight of each individual coordinate value Pc based on the reliability of the intra-image coordinate value Pi used for calculating the each individual coordinate value Pc in the common coordinate system. When the identifier used by the structural feature point extraction unit 41 outputs the reliability map, the above-mentioned reliability is the reliability of the in-image coordinate value Pi. According to the first example, the structural feature point integration unit 43 can suitably increase the weight of the individual coordinate value Pc in the common coordinate system with increasing reliability of the individual coordinate value Pc.

In the second example, the structural feature point integration unit 43 sets the reliability, in consideration of the influence by the lens distortion, of each individual coordinate value Pc in the common coordinate system, and weights the individual coordinate value Pc in the common coordinate system based on the reliability to thereby calculate the center of gravity. In this case, for example, the structural feature point integration unit 43 sets the reliability of each individual coordinate value Pc in the common coordinate system so that, the closer to the center (i.e., the camera center) of the captured image Im the individual coordinate value Pc in the common coordinate system calculated from the intra-image coordinate value Pi is, the higher the value of the reliability described above becomes. In this case, the structural feature point integration unit 43 refers to the normal distribution having the center of the captured image Im as the maximum value, and determines the reliability of the individual coordinate value Pc in the common coordinate system based on the intra-image coordinate value Pi. According to the second example, the structural feature point integration unit 43 can suitably determine the weight of each individual coordinate value Pc in the common coordinate system that suitably reflects the influence by the lens distortion.

Various changes may be applied to the integration process for each structural feature point shown in FIG. 13.

For example, the structural feature point integration unit 43 may execute only step S23 without performing step S21 and step S22. In this case, the structural feature point integration unit 43 refers to the labels for the individual coordinate values Pc in the common coordinate system and calculates the representative coordinate value Pcr that is the center of gravity of the individual coordinate values Pc in the common coordinate system for each label. In another example, at step S23, for each cluster, the structural feature point integration unit 43 may select the individual coordinate value Pc in the common coordinate system closest to the center of gravity of the individual coordinate values Pc in the common coordinate system as the representative coordinate value Pcr.

In yet another example, the structural feature point integration unit 43 may determine a plurality of candidates of the representative coordinate value Pcr, and allow the user of each display device 1 to select one candidate from the plurality of candidates as the representative coordinate value Pcr. In this case, the server device 2 determines, for example, each individual coordinate value Pc in the common coordinate system of each structural feature point for each image acquisition device as a candidate of the representative coordinate value Pcr, and generates test display information S2 based on the coordinate transformation information Ic generated from each candidate for each image acquisition device. The server device 2 sequentially displays the virtual object based on the test display information S2 for each candidate on a display device 1 by transmitting the generated test display information S2 to the display device 1. Then, by receiving an instruction signal for selecting one candidate from the display device 1, the server device 2 determines the representative coordinate value Pcr and the coordinate transformation information Ic to be used for the display device 1.

(9) Coordinate Transformation Information

Figure 14:
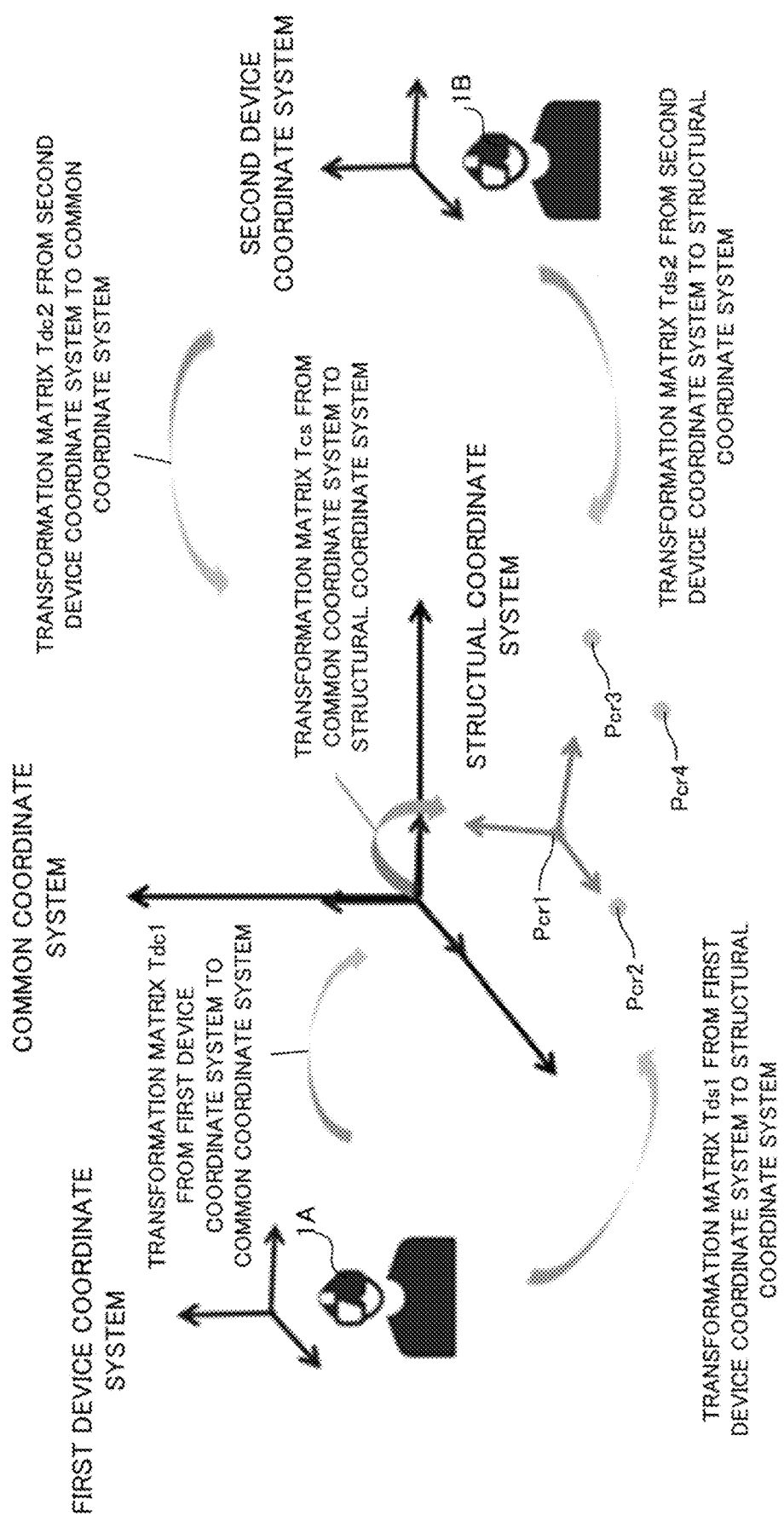
FIG. 14 illustrates a relation among the device coordinate systems of the two display devices, a common coordinate system, and the structural coordinate system.
Figure 15:
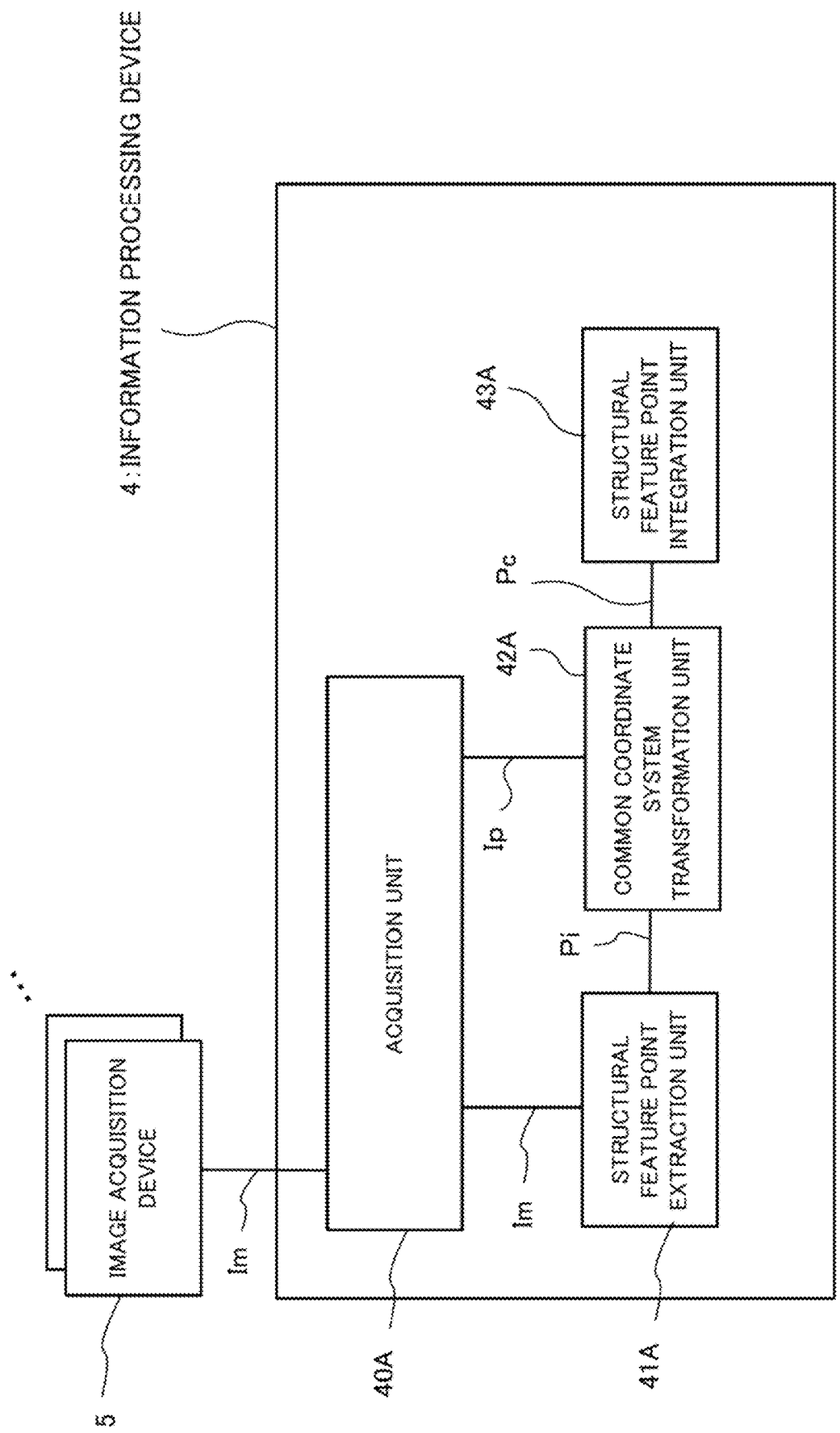
FIG. 15 illustrates a schematic configuration of an information processing device in a second example embodiment.

Next, a description will be given of the coordinate transformation information Ic which the coordinate transformation information generation unit 44 generates for each display device 1. FIG. 14 illustrates a relation among the device coordinate system of the display device 1A and the display device 1B, the common coordinate system, and the structural coordinate system. Hereinafter, the device coordinate system of the display device 1A is referred to as "first device coordinate system", and the device coordinate system of the display device 1B is referred to as "second device coordinate system". Further, "Tds1" denotes the coordinate transformation matrix from the first device coordinate system to the structural coordinate system, and "Tds2" denotes the coordinate transformation matrix from the second device coordinate system to the structural coordinate system.

In this case, based on the coordinate transformation matrix "Tdc1" from the first device coordinate system to the common coordinate system and the coordinate transformation matrix "Tcs" from the common coordinate system to the structural coordinate system, the coordinate transformation information generation unit 44 calculates the coordinate transformation matrix Tds1 (=Tdc1 times Tcs). Further, based on the coordinate transformation matrix "Tdc2" from the second device coordinate system to the common coordinate system and the coordinate transformation matrix Tcs from the common coordinate system to the structural coordinate system, the coordinate transformation information generation unit 44 calculates the coordinate transformation matrix Tds2 (=Tdc2 times Tcs). In practice, the coordinate transformation information generation unit 44 further calculates each translation vector corresponding to the difference in the origin positions of the coordinate systems.

Here, a description will be given of a calculation method of the coordinate transformation matrix Tcs from the common coordinate system to the structural coordinate system. The coordinate transformation information generation unit 44 calculates the coordinate transformation matrix Tcs on the basis of the representative coordinate values Pcr (here, the representative coordinate values Pcr1 to Pcr4 for the structural feature points P1 to P4 shown in FIG. 11) in the common coordinate system calculated by the structural feature point integration unit 43. Specifically, for each structural feature point, the coordinate transformation information generation unit 44 associates and matches the representative coordinate values Pcr1 to Pcr4 with the coordinate values (registered position information in FIG. 3), in the structural coordinate system, of the structural feature points P1 to P4 registered in the structure data. Then, the coordinate transformation information generation unit 44 calculates, based on the least squares method or the like, the coordinate transformation matrix Tcs (and the translation vector) such that the representative coordinate values Pcr1 to Pcr4 are most closely approximated by the coordinate values, in the structural coordinate systems, of the structural feature points P1 to P4. The coordinate transformation matrix Tcs (and the translation vector) is an example of the "first coordinate transformation information".

Next, a supplementary explanation will be given of a calculation method of the coordinate transformation matrix Tdc1 from the first device coordinate system to the common coordinate system. The coordinate transformation information generation unit 44 calculates the coordinate transformation matrix Tdc1 based on the information indicative of the position and orientation of the display device 1A stored in the position information storage unit 23. In this case, for example, the coordinate transformation information generation unit 44 calculates the coordinate transformation matrix Tdc1 (and the translation vector), by setting the first device coordinate system with reference to the orientation and position of the display device 1A estimated based on the seat information of the user of the display device 1A stored in the position information storage unit 23. Similarly, the coordinate transformation information generation unit 44 calculates the coordinate transformation matrix Tdc2 (and the translation vector) based on the information indicative of the position and orientation of the display device 1B stored in the position information storage unit 23. The coordinate transformation matrix Tdc1 and the coordinate transformation matrix Tdc2 (and their translation vectors) are an example of the "second coordinate transformation information."

The coordinate transformation information Ic is not limited to being information to be used when converting the structural coordinate system to the device coordinate system, and it may be information to be used when converting the device coordinate system to the structural coordinate system. It is noted that the rotation matrix and the translation vector for coordinate transformation from the structural coordinate system to the device coordinate system can be converted into a rotation matrix (that is an inverse of the rotation matrix described above) and a translation vector (the translation vector described above with sign inversion) for coordinate transformation from the device coordinate system to the structural coordinate system.

By calculating such coordinate transformation information Ic for each display device 1, the server device 2 can associate the device coordinate system of each display device 1 with the structural coordinate system. Thus, even when a sufficient number of structural feature points cannot be detected in a certain display device 1, the server device 2 can accurately convert the device coordinate system of the display device 1 to the structural coordinate system.
(10) Modification Instead of the configuration of the display system 100 shown in FIG. 1, any of the display device 1 may function as a server device 2.

In this case, a display device 1 (i.e., master display device) functioning as the server device 2 receives the captured images Im from other display devices 1 and the fixed camera 3 and thereby generates the coordinate transformation information Ic and the display information S2 of each display device 1 to distribute the display information S2. In this case, the display device 1 functioning as the server device 2 may include the parameter storage unit 21, the structure data storage unit 22, and the position information storage unit 23, or one or more server devices capable of communicating with the display device 1 functioning as the server device 2 may include the parameter storage unit 21, the structure data storage unit 22, and the position information storage unit 23. Also in this modification, the display system 100 suitably executes the calibration process for each display device 1, and can suitably display the virtual object on each display device 1.

Third Example Embodiment

FIG. 14 shows a schematic configuration of an information processing device 4 in the third example embodiment. As shown in FIG. 14, the information processing device 4 includes an acquisition unit 40A, a structural feature point extraction unit 41A, a common coordinate system transformation unit 42A, and a structural feature point integration unit 43A. The information processing device 4 is realized, for example, by the control unit 27 of the server device 2 in the first example embodiment.

The acquisition unit 40A is configured to acquire captured images Im generated by plural image acquisition devices 5 and positional relation information Ip indicative of a positional relation among the plural image acquisition device 5. Here, examples of the image acquisition devices 5 include the display devices 1 and the fixed camera 3 in the first example embodiment.

The structural feature point extraction unit 41A is configured to extract, from each of the captured images Im, intra-image coordinate values Pi for structural feature points, which are structural feature points of a target structure of observation through a display device, the display device displaying a virtual object superimposed on a view. The display device described above is, for example, a display device 1 of the first example embodiment.

The common coordinate system transformation unit 42A is configured to convert, based on the positional relation information Ip, the intra-image coordinate values Pi for each of the structural feature points extracted from each of the captured images Im into individual coordinate values Pc indicating coordinate values in a common coordinate system which is a common three-dimensional coordinate system. Examples of the common coordinate system conversion unit 42A include the common coordinate system transformation unit 42 according to the first example embodiment. The structural feature point integration unit 43A is configured to determine, for each of the structural feature points, a representative coordinate value Pcr in the common coordinate system based on the individual coordinate values Pc in the common coordinate system. Examples of the structural feature point integration unit 43A include the structural feature point integration unit 43 in the first example embodiment.

According to this example embodiment, the information processing device 4 can accurately determine the position of the structural feature points of the target structure Tag necessary for calibration of a display device that provides augmented reality.

In the example embodiments described above, the program is stored by any type of a non-transitory computer-readable medium (non-transitory computer readable medium) and can be supplied to a control unit or the like that is a computer. The non-transitory computer-readable medium include any type of a tangible storage medium. Examples of the non-transitory computer readable medium include a magnetic storage medium (e.g., a flexible disk, a magnetic tape, a hard disk drive), a magnetic-optical storage medium (e.g., a magnetic optical disk), CD-ROM (Read Only Memory), CD-R, CD-R/W, a solid-state memory (e.g., a mask ROM, a PROM (Programmable ROM), an EPROM (Erasable PROM), a flash ROM, a RAM (Random Access Memory)). The program may also be provided to the computer by any type of a transitory computer readable medium. Examples of the transitory computer readable medium include an electrical signal, an optical signal, and an electromagnetic wave. The transitory computer readable medium can provide the program to the computer through a wired channel such as wires and optical fibers or a wireless channel.

The whole or a part of the example embodiments (including modifications, the same shall apply hereinafter) described above can be described as, but not limited to, the following Supplementary Notes.

[Supplementary Note 1]

An information processing device comprising:

an acquisition unit configured to acquire captured images generated by plural image acquisition devices and positional relation information indicative of a positional relation among the plural image acquisition device;

a structural feature point extraction unit configured to extract, from each of the captured images, intra-image coordinate values for structural feature points, which are structural feature points of a target structure of observation through a display device, the display device displaying a virtual object superimposed on a view;

a common coordinate system transformation unit configured to convert, based on the positional relation information, intra-image coordinate values for each of the structural feature points extracted from each of the captured images into individual coordinate values indicating coordinate values in a common coordinate system which is a common three-dimensional coordinate system; and a structural feature point integration unit configured to determine, for each of the structural feature points, a representative coordinate value in the common coordinate system based on the individual coordinate values in the common coordinate system.

[Supplementary Note 2]

The information processing device according to Supplementary Note 1, wherein the display device functions as one of the plural image acquisition devices, the information processing device further comprising a coordinate transformation information generation unit configured to generate, based on matching between the representative coordinate value for each of the structural feature point and a coordinate value of each of the structural feature point indicated by structure data, first coordinate transformation information regarding a coordinate transformation between the common coordinate system and a structural coordinate system that is a coordinate system adopted in the structure data, the structure data including information regarding a position and a class of each of the structural feature points of the target structure.

[Supplementary Note 3]

The information processing device according to Supplementary Note 2, wherein the coordinate transformation information generation unit generates, based on the first coordinate transformation information and second coordinate transformation information regarding a coordinate transformation between a device coordinate system with reference to the display device and the common coordinate system, coordinate transformation information regarding a coordinate transformation between the device coordinate system and the structural coordinate system, the device coordinate system being generated based on information regarding a position of the display device.

[Supplementary Note 4]

The information processing device according to any one of Supplementary Notes 1 to 3, wherein the display device functions as an image acquisition device of one of the plural image acquisition devices, and wherein the acquisition unit acquires the positional relation information based on information regarding a seat used by a user wearing the display device.

[Supplementary Note 5]

The information processing device according to any one of Supplementary Notes 1 to 3, wherein the plural image acquisition devices include one or more fixed cameras fixed to a venue with a shooting range including the target structure, and wherein the acquisition unit acquires the positional relation information based on the installation information of the fixed camera.

[Supplementary Note 6]

The information processing device according to any one of Supplementary Notes 1 to 5, wherein the structural feature point integration unit divides the individual coordinate values in the common coordinate system for the captured images into a plurality of clusters, and determines the representative coordinate value for each of the structural feature points by calculating a center of gravity of the individual coordinate values in the common coordinate system for each of the plurality of clusters.

[Supplementary Note 7]

The information processing device according to Supplementary Note 6, wherein the structural feature point integration unit calculates the center of gravity based on the individual coordinate values in the common coordinate system each weighted based on the reliability of each of the in-image coordinate values corresponding to each of the individual coordinate values in the common coordinate system.

[Supplementary Note 8]

The information processing device according to Supplementary Note 6 or 7, wherein the structural feature point integration unit determines the representative coordinate value for each of the structural feature points to be the center of gravity calculated by excluding an outlier of the individual coordinate values in common coordinate system in each of the clusters.

[Supplementary Note 9]

The information processing device according to any one of Supplementary Notes 6 to 8, wherein the structural feature point extraction unit extracts the intra-image coordinate value for each of labels indicating classes of the structural feature points, and wherein the structural feature point integration unit determines a label for each of the clusters based on majority voting, for each of the clusters, of the labels corresponding to the individual coordinate values in the common coordinate system.

[Supplementary Note 10]

The information processing device according to any one of Supplementary Notes 1 to 9, wherein the common coordinate system transformation unit calculates the individual coordinate values in the common coordinate system based on the size information of the target structure and the positional relation information.

[Supplementary Note 11]

The information processing device according to any one of Supplementary Notes 1 to 10, wherein the structural feature point extraction unit configures an identifier based on parameters of the identifier learned using plural images and correct answer data and extracts the intra-image coordinate values for each of the labels by inputting the captured images to the identifier, the plural images being obtained by photographing the target structure or a structure with the same type as the target structure, the correct answer data indicating a coordinate value of each of the structural feature points of the target structure or the structure and a label indicative of a class of the each of the structural feature points.

[Supplementary Note 12]

The information processing device according to any one of Supplementary Notes 1 to 11, wherein the information processing device functions as a server device, and the information processing device further comprising a display information distribution unit configured to generate display information relating to a display on the display device based on the representative coordinate value for each of the structural feature points and transmit the display information to the display device.

[Supplementary Note 13]

A control method executed by the information processing device, the control method comprising:

acquiring captured images generated by plural image acquisition devices and positional relation information indicative of a positional relation among the plural image acquisition device;

extracting, from each of the captured images, intra-image coordinate values for structural feature points, which are structural feature points of a target structure of observation through a display device, the display device displaying a virtual object superimposed on a view;

converting, based on the positional relation information, intra-image coordinate values for each of the structural feature points extracted from each of the captured images into individual coordinate values indicating coordinate values in a common coordinate system which is a common three-dimensional coordinate system; and determining, for each of the structural feature points, a representative coordinate value in the common coordinate system based on the individual coordinate values in the common coordinate system.

[Supplementary Note 14]

A storage medium storing a program executed by a computer, the program causing the computer to function as:

an acquisition unit configured to acquire captured images generated by plural image acquisition devices and positional relation information indicative of a positional relation among the plural image acquisition device;

a structural feature point extraction unit configured to extract, from each of the captured images, intra-image coordinate values for structural feature points, which are structural feature points of a target structure of observation through a display device, the display device displaying a virtual object superimposed on a view;

a common coordinate system transformation unit configured to convert, based on the positional relation information, intra-image coordinate values for each of the structural feature points extracted from each of the captured images into individual coordinate values indicating coordinate values in a common coordinate system which is a common three-dimensional coordinate system; and a structural feature point integration unit configured to determine, for each of the structural feature points, a representative coordinate value in the common coordinate system based on the individual coordinate values in the common coordinate system.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

DESCRIPTION OF REFERENCE NUMERALS 1, 1A to 1D Display device
2 Server device
3 Fixed camera
4 Information processing device
6 Learning device
10 Light source unit
11 Optical element
12 Communication unit
13 Input unit
14 Storage unit
15 Camera
16 Status detection sensor
21 Parameter storage unit
22 Structure data storage unit
23 Position information storage unit
24 Training data storage unit

What is claimed is:

1. An information processing device comprising:
at least one memory configured to store instructions; and
at least one processor configured to execute the instructions to
acquire captured images generated by plural image acquisition devices and positional relation information indicative of a positional relation among the plural image acquisition device;

extract, from each of the captured images, intra-image coordinate values for structural feature points, which are structural feature points of a target structure of observation through a display device, the display device displaying a virtual object superimposed on a view;

convert, based on the positional relation information, intra-image coordinate values for each of the structural feature points extracted from each of the captured images into individual coordinate values indicating coordinate values in a common coordinate system which is a common three-dimensional coordinate system; and determine, for each of the structural feature points, a representative coordinate value in the common coordinate system based on the individual coordinate values in the common coordinate system.

2. The information processing device according to claim 1, wherein the display device functions as one of the plural image acquisition devices, and wherein the at least one processor is configured to further execute the instructions to generate, based on matching between the representative coordinate value for each of the structural feature point and a coordinate value of each of the structural feature point indicated by structure data, first coordinate transformation information regarding a coordinate transformation between the common coordinate system and a structural coordinate system that is a coordinate system adopted in the structure data, the structure data including information regarding a position and a class of each of the structural feature points of the target structure.

3. The information processing device according to claim 2, wherein at least one processor is configured to execute the instructions to generate, based on the first coordinate transformation information and
second coordinate transformation information regarding a coordinate transformation between a device coordinate system with reference to the display device and the common coordinate system, coordinate transformation information regarding a coordinate transformation between the device coordinate system and the structural coordinate system, the device coordinate system being generated based on information regarding a position of the display device.

4. The information processing device according to claim 1, wherein the display device functions as an image acquisition device of one of the plural image acquisition devices, and wherein the at least one processor is configured to execute the instructions to acquire the positional relation information based on information regarding a seat used by a user wearing the display device.

5. The information processing device according to claim 1, wherein the plural image acquisition devices include one or more fixed cameras fixed to a venue with a shooting range including the target structure, and wherein the at least one processor is configured to execute the instructions to acquire the positional relation information based on the installation information of the fixed camera.

6. The information processing device according to claim 1, wherein the at least one processor is configured to execute the instructions to divide the individual coordinate values in the common coordinate system for the captured images into a plurality of clusters, and determine the representative coordinate value for each of the structural feature points by calculating a center of gravity of the individual coordinate values in the common coordinate system for each of the plurality of clusters.

7. The information processing device according to claim 6, wherein the at least one processor is configured to execute the instructions to calculate the center of gravity based on the individual coordinate values in the common coordinate system each weighted based on the reliability of each of the in-image coordinate values corresponding to each of the individual coordinate values in the common coordinate system.

8. The information processing device according to claim 6, wherein the at least one processor is configured to execute the instructions to determine the representative coordinate value for each of the structural feature points to be the center of gravity calculated by excluding an outlier of the individual coordinate values in common coordinate system in each of the clusters.

9. The information processing device according to claim 6, wherein the at least one processor is configured to execute the instructions to extract the intra-image coordinate value for each of labels indicating classes of the structural feature points, and wherein the at least one processor is configured to execute the instructions to determine a label for each of the clusters based on majority voting, for each of the clusters, of the labels corresponding to the individual coordinate values in the common coordinate system.

10. The information processing device according to claim 1, wherein the at least one processor is configured to execute the instructions to calculate the individual coordinate values in the common coordinate system based on the size information of the target structure and the positional relation information.

11. The information processing device according to claim 1, wherein the at least one processor is configured to execute the instructions to configure an identifier based on parameters of the identifier learned using plural images and correct answer data and extracts the intra-image coordinate values for each of the labels by inputting the captured images to the identifier, the plural images being obtained by photographing the target structure or a structure with the same type as the target structure, the correct answer data indicating
a coordinate value of each of the structural feature points of the target structure or the structure and
a label indicative of a class of the each of the structural feature points.

12. The information processing device according to claim 1, wherein the information processing device functions as a server device, and the at least one processor is configured to further execute the instructions to generate display information relating to a display on the display device based on the representative coordinate value for each of the structural feature points and transmit the display information to the display device.

13. A control method executed by the information processing device, the control method comprising:

acquiring captured images generated by plural image acquisition devices and positional relation information indicative of a positional relation among the plural image acquisition device;

extracting, from each of the captured images, intra-image coordinate values for structural feature points, which are structural feature points of a target structure of observation through a display device, the display device displaying a virtual object superimposed on a view;

converting, based on the positional relation information, intra-image coordinate values for each of the structural feature points extracted from each of the captured images into individual coordinate values indicating coordinate values in a common coordinate system which is a common three-dimensional coordinate system; and determining, for each of the structural feature points, a representative coordinate value in the common coordinate system based on the individual coordinate values in the common coordinate system.

14. A non-transitory computer readable storage medium storing a program executed by a computer, the program causing the computer to:

acquire captured images generated by plural image acquisition devices and positional relation information indicative of a positional relation among the plural image acquisition device;

extract, from each of the captured images, intra-image coordinate values for structural feature points, which are structural feature points of a target structure of observation through a display device, the display device displaying a virtual object superimposed on a view;

convert, based on the positional relation information, intra-image coordinate values for each of the structural feature points extracted from each of the captured images into individual coordinate values indicating coordinate values in a common coordinate system which is a common three-dimensional coordinate system; and determine, for each of the structural feature points, a representative coordinate value in the common coordinate system based on the individual coordinate values in the common coordinate system.

* * * * *